US012718553B2

(12) United States Patent
Kulkarni et al.

(10) Patent No.: US 12,718,553 B2
(45) Date of Patent: Aug. 25, 2026

(54) BIOMETEOROLOGICAL SENSING DEVICE WITH EMBEDDED COMPUTER VISION

(71) Applicants: Karthik Kashinath Kulkarni, Tempe, AZ (US); Suren Jayasuriya, Tempe, AZ (US); Ariane Middel, Phoenix, AZ (US); Tejaswi Gowda, Tempe, AZ (US); Florian Arwed Schneider, Tempe, AZ (US)

(72) Inventors: Karthik Kashinath Kulkarni, Tempe, AZ (US); Suren Jayasuriya, Tempe, AZ (US); Ariane Middel, Phoenix, AZ (US); Tejaswi Gowda, Tempe, AZ (US); Florian Arwed Schneider, Tempe, AZ (US)

(73) Assignee: ARIZONA BOARD OF REGENTS ON BEHALF OF ARIZONA STATE UNIVERSITY, Scottsdale, AZ (US)

( * ) Notice: Subject to any disclaimer, the term of this patent is extended or adjusted under 35 U.S.C. 154(b) by 894 days.

(21) Appl. No.: 17/962,460

(22) Filed: Oct. 7, 2022

(65) Prior Publication Data

US 2023/0113589 A1 Apr. 13, 2023

Related U.S. Application Data

(60) Provisional application No. 63/253,678, filed on Oct. 8, 2021.

(51) Int. Cl.
*G06V 20/10* (2022.01)
*G01W 1/04* (2006.01)
(Continued)

(52) U.S. Cl.
CPC ............... *G06V 20/10* (2022.01); *G01W 1/04* (2013.01); *G06V 10/70* (2022.01); *G06V 10/95* (2022.01); *G06V 40/10* (2022.01)

(58) Field of Classification Search
None
See application file for complete search history.

(56) References Cited

U.S. PATENT DOCUMENTS

2003/0073401 A1* 4/2003 Gautney' ................ F24F 7/007 454/337
2010/0139194 A1* 6/2010 Burns ................ E04D 13/1693 428/404
2016/0216377 A1* 7/2016 Sane ..................... G01S 7/4808

FOREIGN PATENT DOCUMENTS

WO WO-2019232181 A1 * 12/2019 ............. G01J 5/026

OTHER PUBLICATIONS (2018) Bidirectional feature pyramid network with recurrent attention residual modules for shadow detection | computer vision—ECCV 2018. Available at: https://dl.acm.org/doi/10.1007/978-3-030-01231-1_8 (Accessed: Jul. 10, 2025). (Year: 2018).*

(Continued)

*Primary Examiner* — Erica S Lin
(74) *Attorney, Agent, or Firm* — FULLER IP LAW LLC; Rodney J. Fuller

(57) ABSTRACT

The disclosure concerns biometeorological sensing devices including a processor communicatively coupled to a memory, and a plurality of sensors communicatively coupled to the processor. The plurality of sensors includes a humidity sensor, a UV sensor, an anemometer, an atmospheric thermometer, a globe thermometer, and a camera. The device also includes a network interface communicatively coupled to the processor. The processor is configured to estimate a mean radiant temperature (MRT) using data received from the plurality of sensors, identify a person in an image received from the camera, determine a bounding box that encloses the person in the image, generate a shadow map from the image, calculate an intersection over union (IOU) of the bounding box with the shadow map to deter- (Continued)

mine if the person is in the shade, and transmit observed space usage and estimated MRT to a server communicatively coupled to the network interface.

20 Claims, 7 Drawing Sheets

(51) Int. Cl.

| | |
|---|---|
| ***G06V 10/70*** | (2022.01) |
| ***G06V 10/94*** | (2022.01) |
| ***G06V 40/10*** | (2022.01) |

(56) References Cited

OTHER PUBLICATIONS

Aminipouri, M., Rayner, D., Lindberg, F., Thorsson, S., Knudby, A.J., Zickfeld, K., Middel, A., and Krayenhoff, E.S., "Urban tree planting to maintain outdoor thermal comfort under climate change: The case of Vancouver's local climate zones," Building and Environment, vol. 158, pp. 226-236, 2019.
Arens, E. and Bosselmann, P., "Wind, sun and temperature-predicting the thermal comforf of people in outdoor spaces," Building and Environment, vol. 24, No. 4, pp. 315-320, 1989.
Brostow, G.J. and Cipolla, R., "Unsupervised bayesian detection of independent motion in crowds," CVPR '06, (USA), IEEE Computer Society, 2006.
Bruse M., and Fleer, H., "Simulating surface-plant-air interactions inside urban environments with a three dimensional numerical model," Environmental Modelling and Software, vol. 13, No. 3-4, pp. 373-384, 1998.
Castellano, G., Castiello, C., Mencar, C., and Vessio, G., "Crowd counting from unmanned aerial vehicles with fully-convolutional neural networks," in 2020 International Joint Conference on Neural Networks (IJCNN), pp. 1-8, 2020.
Chan, A., Liang, J., and Vasconcelos, N., "Privacy preserving crowd monitoring: Counting people without people models or tracking," Jun. 2008.
Chen, K., Gong, S., Xiang, T., and Loy, C.C., "Cumulative attribute space for age and crowd density estimation," Jun. 2013.
Chen, K., Loy, C.C., Gong, S., and Xiang, T., "Feature mining for localised crowd counting," in Proceedings of the British Machine Vision Conference, pp. 21.1-21.11, BMVA Press, 2012.
Crank, P.J., Middel, A., Wagner, M., Hoots, D., Smith, M., and Brazel, A., "Validation of seasonal mean radiant temperature simulations in hot arid urban climates," Science of the Total Environment, vol. 749, 2020.
Cybenko, G., "Approximation by superpositions of a sigmoidal function," Mathematics of Control, Signals, and Systems (MCSS), vol. 2, pp. 303-314, Dec. 1989.
Dalal N., and Triggs, B., "Histograms of oriented gradients for human detection," in 2005 IEEE Computer Society Conference on Computer Vision and Pattern Recognition (CVPR'05), vol. 1, pp. 886-893 vol. 1, 2005.
Depatla, S., Muralidharan, A., and Mostofi, Y., "Occupancy estimation using only wifi power measurements," IEEE Journal on Selected Areas in Communications, vol. 33, pp. 1-1, Jul. 2015.
Eliasson, I., Knez, I., Westerberg, U., Thorsson, S., and Lindberg, F., "Climate and behaviour in a nordic city," Landscape and Urban Planning, vol. 82, No. 1, pp. 72-84, 2007.
Eom S. and Nishihori, Y., "How weather and special events affect pedestrian activities: volume, space, and time," International Journal of Sustainable Transportation, vol. 0, No. 0, pp. 1-31, 2021.
Givoni, B., Noguchi, M., Saaroni, H., Potchter, O., Yaakov, Y., Feller, Y.N., and Becker, S., "Outdoor comfort research issues," Energy and Buildings, vol. 35, pp. 77-86, Jan. 2003.
Häb, K., Ruddell, B.L., and Middel, A., "Sensor lag correction for mobile urban microclimate measurements," Urban Climate, vol. 14, pp. 622-635, Dec. 2015.
Hammer B., and Gersmann, K., "A note on the universal approximation capability of support vector machines," Neural Processing Letters, vol. 17, Oct. 2002.
Harlan, S., Brazel, A.J., Prashad, L., Stefanov, W.L., and Larsen, L., "Neighborhood microclimates and vulnerability to heat stress," Social Science & Medicine, vol. 63, No. 11, pp. 2847-2863, 2006.
Hashimoto, Y., Gu, Y., Hsu, L.T., Iryo-Asano, M., and Kamijo, S., "A probabilistic model of pedestrian crossing behavior at signalized intersections for connected vehicles," Transportation Research Part C: Emerging Technologies, vol. 71, pp. 164-181, 2016.
Hoogendoorn, S. and Bovy, P., "Pedestrian route-choice and activity scheduling theory and models," Transportation Research Part B: Methodological, vol. 38, No. 2, pp. 169-190, 2004.
Hsu, Y.W., Chen, Y.W., and Perng, J.W., "Estimation of the number of passengers in a bus using deep learning," Sensors, vol. 20, No. 8, 2020.
Johansson, E., Thorsson, S., Emmanuel, R., and Krüger, E., "Instruments and methods in outdoor thermal comfort studies—the need for standardization," Urban Climate, 2014.
Kántor, N. and Unger, J., "The most problematic variable in the course of human-biometeorological comfort assessment—the mean radiant temperature," Central European Journal of Geosciences, vol. 3, No. 1, pp. 90-100, 2011.
Kjaergaard, M., Wirz, M., Roggen, D., and Troster, G., "Mobile sensing of pedestrian flocks in indoor environments using wifi signals," 2012 IEEE International Conference on Pervasive Computing and Communications, PerCom 2012, Mar. 2012.
Kulkarni et al., "MaRTiny—a Low Cost Bio-meteorological Sensing Device with Embedded Computer Vision for Urban Climate Research," Frontiers in Environmental Science, vol. 10, 2022.
Kuras, E.R., Richardson, M.B., Calkins, M.M., Ebi, K.L., Hess, J.J., Kintziger, K.W., Jagger, M.A., Middel, A., Scott, A. A., Spector, J.T., Uejio, C.K., Vanos, J.K., Zaitchik, B.F., Gohlke, J.M., and Hondula, D.M., "Opportunities and challenges for personal heat exposure research," Environmental Health Perspectives, vol. 125, No. 8, 2017.
Lau, B. P. L., Wijerathne, N., Ng, B. K. K., and Yuen, c., "Sensor fusion for public space utilization monitoring in a smart city," IEEE Internet of Things Journal, vol. 5, No. 2, pp. 473-481, 2018.
Lee, J.M., "Exploring walking behavior in the streets of new york city using hourly pedestrian count data," Sustainability, vol. 12, No. 19, 2020.
Lempitsky V. and Zisserman, A., "Learning to count objects in images," in Advances in Neural Information Processing Systems (J. Lafferty, C. Williams, J. Shawe-Taylor, R. Zemel, and A. Culotta, eds.), vol. 23, Curran Associates, Inc., 2010.
Liu, W., Salzmann, M., and Fua, P., "Context-aware crowd counting," in Proceedings of the IEEE/CVF Conference on Computer Vision and Pattern Recognition (CVPR), Jun. 2019.
Matzarakis, A., Rutz, F., and Mayer, H., "Modelling radiation fluxes in simple and complex environments: Basics of the RayMan model," International Journal of Biometeorology, vol. 54, No. 2, pp. 131-139, 2010.
Middel, A., Krayenhoff, E.S., "Micrometeorological determinants of pedestrian thermal exposure during record-breaking heat in Tempe, Arizona: Introducing the MaRTy observational platform", Science of the Total Environment, 687, 2019, p. 137-151.
Middel, A., Lukasczyk, J., Maciejewski, R., et al., "Sky view factors from synthetic fisheye photos for thermal comfort routing—a case study in phoenix, arizona," Urban Planning, vol. 2, No. 1, pp. 19-30, 2017.
Middel, A., Alkhaled, S., Schneider, F.A., Hagen, B., and Coseo, P., "50 Grades of Shade," Bulletin of the American Meteorological Society, pp. 1-35, May 2021.
Middel, A., Häb, K., Brazel, A.J., Martin, C.S., and Guhathakurta, S., "Impact of urban form and design on mid-afternoon microclimate in Phoenix Local Climate Zones," Landscape and Urban Planning, vol. 122, pp. 16-28, 2014.
Middel, S., Turner, V.K., Schneider, F.A., Zhang, Y., and Stiller, M., "Solar reflective pavements—a policy panacea to heat mitigation?," Environmental Research Letters, vol. 15, No. 6, 2020.

(56) References Cited

OTHER PUBLICATIONS

Raykov, Y., Özer, E., Dasika, G., Boukouvalas, A., and Little, M., "Predicting room occupancy with a single passive infrared (pir) sensor through behavior extraction," pp. 1016-1027, Sep. 2016.
Redmon, J. and Farhadi, A., "Yolov3: An incremental improvement," 2018.
Redmon, J., Divvala, S., Girshick, R., and Farhadi, A., "You only look once: Unified, real-time object detection," 2016.
Stewart, R., Andriluka, M., and Ng, A.Y., "End-to-end people detection in crowded scenes," in Proceedings of the IEEE Conference on Computer Vision and Pattern Recognition (CVPR), Jun. 2016.
Thorsson, S., Honjo, T., Lindberg, R., Eliasson, I., and Lim, E.M., "Thermal comfort and outdoor activity in japanese urban public places," Environment and Behavior, vol. 39, pp. 660-684, Jan. 2006.
Thorsson, S., Rocklöv, J., Konarska, J., Lindberg, F., Holmer, B., Dousset, B., and Rayner, D., "Mean radiant temperature—a predictor of heat related mortality," Urban Climate, vol. 10, pp. 332-345, 2014.
Vanos, J., Rykaczewski, K., Middel, A., Vecellio, E., Brown, R., and Gillespie, T., "Improved methods for estimating mean radiant temperature in hot and sunny outdoor settings," International Journal of Biometeorology, vol. 65, Apr. 2021.
Viola P., and Jones, M., "Rapid object detection using a boosted cascade of simple features," vol. 1, pp. 1-511, Feb. 2001.
Viola, P., Jones, M., and Snow, D., "Detecting pedestrians using patterns of motion and appearance.," vol. 63, pp. 734-741, Jan. 2003.
Wahl, F., Milenkovic, M., and Amft, O., "A distributed pir-based approach for estimating people count in office environments," in 2012 IEEE 15th International Conference on Computational Science and Engineering, pp. 640-647, 2012.
Wang M., and Wang, X., "Automatic adaptation of a generic pedestrian detector to a specific traffic scene," in CVPR 2011, pp. 3401-3408, 2011.
Weppner, J., and Lukowicz, P., "Bluetooth based collaborative crowd density estimation with mobile phones," pp. 193-200, Mar. 2013.
Wu, B., and Nevatia, R., "Detection of multiple, partially occluded humans in a single image by bayesian combination of edgelet part detectors," Tenth IEEE International Conference on Computer Vision (ICCV'05) vol. 1, vol. 1, pp. 90-97 vol. 1, 2005.
Yao, Y., Zhang, X., Liang, Y., Zhang, X., Shen, F., and Zhao, J., "A real-time pedestrian counting system based on rgb-d," in 2020 12th International Conference on Advanced Computational Intelligence (ICACI), pp. 110-117, 2020.
Zappi, P., Farella, E., and Benini, L., "Tracking motion direction and distance with pyroelectric ir sensors," IEEE Sensors Journal, vol. 10, No. 9, pp. 1486-1494, 2010.
Zhang, C., Li, H., Wang, X., and Yang, X., "Cross-scene crowd counting via deep convolutional neural networks," in Proceedings of the IEEE Conference on Computer Vision and Pattern Recognition (CVPR), Jun. 2015.
Zhu, L., Deng, Z., Hu, X., Fu, C.W., Xu, X., Qin, J., and Heng, P.A., "Bidirectional feature pyramid network with recurrent attention residual modules for shadow detection," in ECCV, 2018.

* cited by examiner

BIOMETEOROLOGICAL SENSING DEVICE WITH EMBEDDED COMPUTER VISION

CROSS REFERENCE TO RELATED APPLICATIONS

This disclosure claims the benefit, including the filing date, of U.S. Provisional Patent Application No. 63/253,678, entitled "Biometeorological Sensing Device with Embedded Computer Vision" which was filed on Oct. 8, 2021, the entire disclosure of which is hereby incorporated herein by this reference.

STATEMENT REGARDING FEDERALLY SPONSORED RESEARCH

This invention was made with government support under 1942805 awarded by the National Science Foundation. The government has certain rights in the invention.

TECHNICAL FIELD

The present invention relates to biometeorological sensing devices.

BACKGROUND

The year 2020 marked the Earth's warmest 10-year period with an average increase in global temperature of 1.3° C. above pre-industrial levels. Extreme heat and related heat waves put tremendous stress on individuals' health and well-being and limits their ability to work, travel, and socialize in outdoor settings. Globally, extreme heat and associated heat wave events are occurring more frequently and longer (Masson-Delmotte et al., 2021). Future trends of urban warming indicate the need for adaption measures to promote resilience in the population. The outdoor urban environment is a complex arrangement of urban forms and materials that impact how heat is experienced by pedestrians at the microscale. In hot, dry cities, pedestrian comfort is strongly dictated by the availability of shade (Middel et al., 2014; Colter et al., 2019). Pedestrian may respond to microscale outdoor conditions by changing their walking path from sun to shade or vice versa based on their heat exposure.

The most common way to report urban heat is air temperature, which has been shown to be insufficient to quantify personal heat exposure (Harlan et al., 2006; Kuras et al., 2017). A more human-centric metric that emphasizes the heat load on the human body is the Mean Radiant Temperature (hereinafter, MRT). MRT objectively quantifies the total short- and longwave radiation the human body is exposed to at a given location and time (Kántor and Unger, 2011). This includes longwave radiation emitted from surrounding surfaces, such as asphalt parking lots or concrete walls, and shortwave radiation from the Sun. MRT roughly equals air temperature in the shade but can be 30° C. higher in the Sun, making a person feel much less comfortable when it is hot. In warm, dry climates such as the desert city of Phoenix, Arizona in the USA, MRT is the heat metric that best describes how people experience heat (Middel et al., 2016). MRT is also a crucial input parameter for calculating outdoor human thermal comfort indices such as PET (Hoppe, 1999) and UTCI (Jendritzky et al., 2012).

MRT has been successfully used in urban climate and human biometeorology research to predict heat-related mortality and outperformed air temperature as predictor (Thorsson et al., 2014). Using computer simulations, MRT was estimated to assess the impact of tree planting strategies on human thermal exposure under climate change in Vancouver, Canada (Aminipouri et al., 2019) and to perform thermal comfort routing in Tempe, Arizona, USA (Middel et al., 2017). Observational studies have quantified the benefit of shade for thermal comfort of different shade types including trees, engineered structures, and urban form (Lee et al., 2018; Middel et al., 2021). Accurate, high resolution MRT measurements require expensive equipment, such as the biometeorological instrument platform MaRTy (Middel and Krayenhoff, 2019), but lower-cost alternatives such as the gray 38 mm globe thermometers and cylindrical thermometers have been developed (Thorsson et al., 2006; Brown, 2019; Vanos et al., 2021).

Active shade management in cities is important, especially in the Southwestern US, to provide shade where people work, travel, and socialize outdoors, because cooling benefits are hyperlocal.

SUMMARY

While a large body of literature has investigated shade and microclimate in hot regions (Ali-Toudert and Mayer, 2007; Emmanuel et al., 2007; Shashua-Bar et al., 2009; Coutts et al., 2016), little information exists on how people use public spaces and when and where they are exposed to outdoor heat. We close this gap by developing a novel low-cost, portable, smart IoT weather station (MaRTiny) that can measure passively the local meteorological conditions, the heat exposure at the given location and count people in the shade and Sun. Connecting hyperlocal meteorological conditions with space use data captured by a camera reveals behavioral patterns of shade and sun preferences that vary by time of day, location, and ambient conditions. MaRTiny, as a passive sensor package, designed for hot, dry climates, provides local heat exposure, such as MRT, and space use data without using an external database.

In some aspects, the disclosure concerns biometeorological sensing devices comprising: a processor communicatively coupled to a memory; a plurality of sensors communicatively coupled to the processor, the plurality of sensors comprising a humidity sensor, a UV sensor, an anemometer, an atmospheric thermometer, a globe thermometer, and a vision system; and a network interface communicatively coupled to the processor; wherein the processor is configured to: estimate a mean radiant temperature (MRT) using data received from the plurality of sensors; identify a person in an image received from the vision system; determine a bounding box that encloses the person in the image; generate a shadow map from the image; calculate an intersection over union (IOU) of the bounding box with the shadow map to determine if the person is in the shade; and transmit observed space usage and estimated MRT to a server communicatively coupled to the network interface.

In some sensing devices, an embedded computer board is configured to execute a deep learning model. In some embodiments, the embedded computer board is configured to execute a deep learning model is utilized to detect people in shade and sun.

In certain embodiments, the processor generates the shadow map by instructing the embedded computer board to execute a Bi-directional Feature Pyramid with Recurrent Attention Residual Module on the image, the image being provided to the embedded computer board by the processor.

In some embodiments, the vison system comprises a camera. In certain aspects, the vision system has capabilities of object detection and identification.

In certain sensing devices, the computer board is configured to record air temperature, relative humidity, globe temperature, and wind speed at predetermined regular intervals. In some embodiments, the vision system capabilities include shade detection in outdoor areas. In certain embodiments, air temperature is measured using a white shield to reflect solar radiation to minimize solar radiation impact on the air temperature measurement.

Some sensing devices have sensors that are configured to be powered by DC power.

Other aspects of the disclosure concern methods of monitoring biometeorological conditions and people's use of public spaces with changing weather conditions, the method comprising utilizing a plurality of sensors communicatively coupled to the processor to obtain and store humidity, UV level, wind speed and/or pressure using an anemometer, atmospheric temperature, mean radiant temperature using a globe thermometer, and images using a vision system; wherein sensor data is stored using a network interface communicatively coupled to the processor; wherein the processor: estimates a mean radiant temperature (MRT) using data received from the plurality of sensors; identifies a person in an image received from the camera; determines a bounding box that encloses the person in the image; generates a shadow map from the image; calculates an intersection over union (IOU) of the bounding box with the shadow map to determine if the person is in the shade; and transmits observed space usage and estimated MRT to a server communicatively coupled to the network interface.

Some methods utilize an embedded computer board that is configured to execute a deep learning model to detect people in shade and sun. In certain embodiments, the processor generates the shadow map by instructing the embedded computer board to execute a Bi-directional Feature Pyramid with Recurrent Attention Residual Module on the image, the image being provided to the embedded computer board by the processor.

In some embodiments, air temperature, relative humidity, globe temperature, and wind speed are recorded at predetermined regular intervals.

In certain embodiments, the vision system comprises a camera. In certain embodiments, the vision system identifies objects.

In some embodiments, the vision system identifies shade in outdoor areas.

Some methods use sensors that are powered by DC power.

Some methods measure the air temperature using a white shield to reflect solar radiation to minimize solar radiation impact on the air temperature measurement.

In certain methods, the processer transmits data to a cloud database using WiFi.

DETAILED DESCRIPTION

Figure 1:
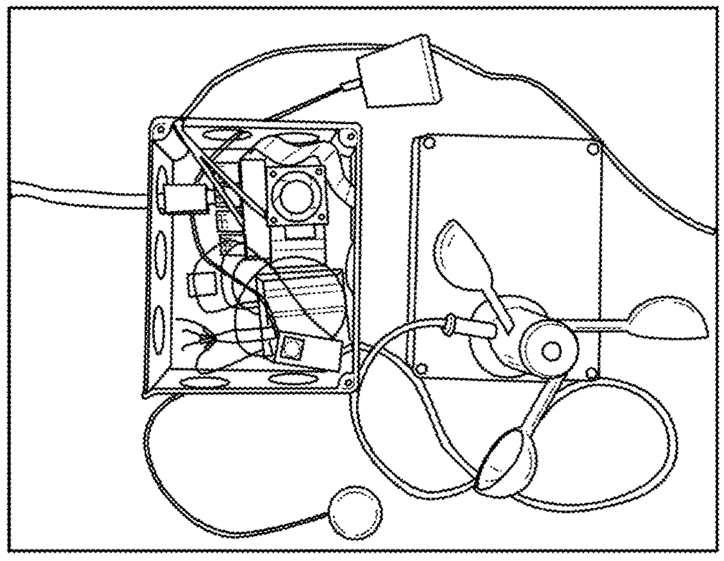
FIG. 1 presents a top view of one MaRTiny setup. The Jetson Nano has a cooling fan, a camera and WiFi module. The Arduino board is connected to different meteorological sensors.

This disclosure, its aspects and implementations, are not limited to the specific material types, components, methods, or other examples disclosed herein. Many additional material types, components, methods, and procedures known in the art are contemplated for use with particular implementations from this disclosure. Accordingly, for example, although particular implementations are disclosed, such implementations and implementing components may comprise any components, models, types, materials, versions, quantities, and/or the like as is known in the art for such systems and implementing components, consistent with the intended operation.

The word "exemplary," "example," or various forms thereof are used herein to mean serving as an example, instance, or illustration. Any aspect or design described herein as "exemplary" or as an "example" is not necessarily to be construed as preferred or advantageous over other aspects or designs. Furthermore, examples are provided solely for purposes of clarity and understanding and are not meant to limit or restrict the disclosed subject matter or relevant portions of this disclosure in any manner. It is to be appreciated that a myriad of additional or alternate examples of varying scope could have been presented, but have been omitted for purposes of brevity.

"Globe temperature" is measured with a temperature sensor (here, a thermometer thermometer) placed inside a globe (here, a ping pong ball).

Mean Radiant Temperature (MRT) is the uniform temperature of an imaginary enclosure (or environment) in which the radiant heat transfer from the human body is equal to the radiant heat transfer in the actual nonuniform enclosure (or environment).

While this disclosure includes a number of embodiments in many different forms, there is shown in the drawings and will herein be described in detail particular embodiments with the understanding that the present disclosure is to be considered as an exemplification of the principles of the disclosed methods and systems, and is not intended to limit the broad aspect of the disclosed concepts to the embodiments illustrated.

Mean Radiant Temperature (MRT) Sensing

MRT is typically determined with integral radiation measurements using the so-called 6-directional method (Höppe, 1992). Three net radiometers are orthogonally setup to measure the longwave and shortwave radiation in six directions. The radiative fluxes are then summarized into a temperature value using the Stefan-Boltzmann Law:

$$MRT = \sqrt[4]{\frac{\sum_{i=1}^{6} W_i(a_k K_i + a_l L_i)}{a_l \sigma}} - 273.15 \tag{1}$$

where $K_i$ and $L_i$ are the directional shortwave and longwave radiation fluxes, respectively; $a_k$ and $a_l$ are absorption coefficients for short- and long wave radiation fluxes, respectively; σ is the Stefan-Boltzmann constant; and $W_i$ are factors that weigh the directional fluxes to match the cylindrical shape of the human standing body (0.06 is used for sensors pointing up and down, 0.22 for lateral sensors). This method is limited by cost with three net radiometers that cost $5K each (All prices are at the time of testing).

A more affordable but less accurate method to estimate MRT is using a black globe thermometer. Globe thermometers such as the Kestrel Heat Stress meter ($500) have been used to quantify the heat load of pedestrians, athletes, and outdoor workers in various studies (Johansson et al., 2014). Thorsson et al. (2006) developed a low-cost globe thermometer using a thermocouple in a gray ping pong ball (<$100). The acrylic gray color of the globe almost matches the average albedo of the combination of the human skin and clothing to reliably estimate MRT (Olesen et al., 1989; Thorsson et al., 2006). Albedo variations based on clothing and skin color are large between people and cannot simply be represented by one color alone, hence this gray globe can provide an accurate estimate for the average combined albedo which can be used as a reference.

Various convection coefficients have been developed for globe thermometers to improve MRT estimations from globe temperature (Oliveira et al., 2019; Manavvi and Rajasekar, 2020; Acero et al., 2021; Alfano et al., 2021). Those coefficients are usually derived under specific outdoor conditions and cannot be generalized easily. Here, we will use an empirical model for acrylic gray globe temperature Tg developed by Vanos et al. (2021) in Phoenix, AZ based on air temperature Ta, wind speed Va, globe thermometer diameter D=38 mm, and emissivity ε=0.97 of the globe:

$$MRT = \left\{(1.6T_g - 0.339T_a - 8.69 + 273.15)^4 + \left(0.24 + 2.08V_a^{0.5} + 1.14V_a^{0.667}\right)(1.6T_g - 0.339T_a - 8.69 - T_a)10^8\right\}^{1/4} - 273.15$$

Due to limited sensing resources, MRT measurements across space and time are usually sparse. To address this gap, microclimate and radiation models have been developed that can calculate MRT using information on urban forms and meteorological data. However, it has been shown that conventional models do not perform well in extreme heat cases and struggle with complex urban forms. Currently, no model can accurately estimate MRT in the absence of detailed urban form parameters.

Much research has been developed for pedestrian counting and crowd estimation. Sensor-based techniques (Zappi et al., 2010; Wahl et al., 2012; Raykov et al., 2016; Lau et al., 2018) use passive infrared (PIR) and proximity sensors to monitor moving pedestrians. Although these setups are compact and low-cost, they have a low accuracy and misclassify often, and work best only under certain environmental conditions. Alternatively, network-based techniques (Kjærgaard et al., 2012; Weppner and Lukowicz, 2013; Depatla et al., 2015) use Bluetooth and WiFi networks for crowd sensing.

Recently, machine learning techniques low-level image feature extraction methods (Chen et al., 2013, 2012), such as Haar cascade (Viola and Jones, 2001) and HOG (Histogram of Oriented Gradient) (Dalal and Triggs, 2005; Yao et al., 2020) combined with regression models such as SVM (Support Vector Machine) (Yao et al., 2020) or detectors such as AdaBoost (Viola and Snow, 2003). State-of-the-art methods leverage deep convolutional neural networks for crowd estimation using individual detection (Wu and Nevatia, 2005; Brostow and Cipolla, 2006; Wang and Wang, 2011; Stewart et al., 2016; Liu et al., 2019) and using perspective maps (Chan et al., 2008; Lempitsky and Zisserman, 2010; Zhang et al, 2015).

Further, there are works revolving around analysis of crowd behaviour in urban areas (Hoogendoorn and Bovy, 2004; Hashimoto et al, 2016; Lee, 2020) and their relation with thermal comfort (Arens and Bosselmann, 1989; Givoni et al., 2003; Eliasson et al., 2007; Eom and Nishihori, 2021). In some aspects, we do not aim to outperform any existing pedestrian counting techniques, but to combine them with a weather station as a single setup.

In summary, thermal exposure measurements in tandem with public space use assessments are crucial for active shade management in cities, but accurate MRT measurement setups are expensive and bulky. Low-cost systems such as gray globe thermometers have been developed but are not connected to the cloud for easy data storage and analysis. In addition, such low-cost sensors can suffer from over- and under-estimation of MRT at various times of the day as noted in previous literature. None of the existing MRT sensing platforms have vision capabilities, and space use is often assessed through time-consuming manual observations. Finally, physics-based MRT models require detailed 3D data of the urban environment to model radiation flux densities and sun-exposure. Our MaRTiny system aims to address all these gaps.

Presented herein is a low-cost, portable, biometeorological sensing device and system that can measure passively the local meteorological conditions, the heat exposure at the given location and count people in the shade and sun using embedded computer vision. Connecting hyperlocal meteorological conditions with space use data captured by a camera reveals behavioral patterns of shade and sun preferences that vary by time of day, location, and ambient conditions. The instant biometeorological sensing devices (hereinafter "BSD" or "device"), as a passive sensor package designed for hot, dry climates, can provide local heat exposure, such as MRT, and space use data without requiring the use of an external database. According to various embodiments, the BSD is able to provide space use data as well as hyperlocal meteorological conditions in a portable package that employs inexpensive hardware.

According, in various embodiments, the instant BSD comprises a weather station, a vision system, and a machine learning module that provides MRT. Various embodiments of the BSD provide a low-cost and compact Internet of Things (IoT) weather station that records air temperature, relative humidity, globe temperature, and wind speed at regular intervals. Globe temperature can be converted to MRT and validated with high-end MRT measurements.

The instantly described BSD also comprises a low-cost, low-powered, compact and smart vision system driven by state-of-the-art AI algorithms. According to various embodiments, this system counts pedestrians and is also capable of identifying whether a pedestrian is under the cooling effect of shade. Some embodiments have demonstrated a precision of 95% for pedestrian detection and an accuracy of 80% for shade detection, outperforming more expensive, in time and/or money, conventional methods for monitoring space use. Advantageously, the instant device does not require active human labor during the collection of this data, saving money, time, while also reducing the need for human exposure to extreme heat conditions.

Furthermore, various embodiments of the instant BSD employ a machine learning model that relies only on a few meteorological parameters while still being robust to changes in the surrounding environment. Some embodiments of this model correct the errors generated by the electrical noises created by sensors and the circuit, and predict with an accuracy of RMSE=4° C.

FIG. 1 is a top view of a non-limiting example of a biometeorological sensing device. As shown, the BSD comprises a plurality of sensors communicatively coupled to at least one processor communicatively coupled to a network interface. The various components will be discussed in greater detail, below. According to various embodiments, the BSD operates as a compact, IoT, low-cost sensing and vision/recording/surveying platform. The primary functionality is to measure MRT for a given sun-exposed location using conventional meteorological sensors and a globe thermometer. The BSD measures air temperature, relative humidity, wind speed, and globe temperature, which are used to calculate MRT.

In addition, various embodiments of the BSD are outfitted with a camera to detect and count people in the shade and sun within the observed area. The detected data will give an indication about pedestrian behavior in public spaces (e.g., identifying the number of people who utilize shade, umbrellas, bicycles and other transportation, etc.). The camera and people detection system preserves privacy by only storing quantitative metrics (e.g., people count, etc.) and discarding the captured images.

The entire system may transmit data to an external server, such as a cloud database, using WIFI or other networking technologies known in the art such as cellular, mesh networks, and the like. The BSD can be powered with a single power source, making it convenient for mobile deployment. Some embodiments may make use of solar or other renewable power sources.

Advantageous over conventional devices, the BSD is low cost while providing data comparable to more expensive conventional setups. As a specific example, one embodiment was built for under $200 using different micro-controllers and AI edge devices (e.g., embedded computing board, etc.). The instant BSD is able to capture MRT data and correlate it with pedestrian behavior in outdoor settings at a fraction of the size and cost of conventional solutions. Advantageously, the BSD does not need any active human labor during the collection of data, saving funds, time, and health during extreme heat conditions.

According to various embodiments, the BSD comprises at least one processor to process the readings from sensors and implement machine vision algorithms in determining use of space. In some embodiments, the BSD may comprise a single, powerful processor. In other embodiments, however, the BSD may comprise multiple processors adapted for particular purposes. For example, in some embodiments, including the non-limiting example shown in FIG. 1, the BSD comprises a plurality of microcontrollers (e.g., Arduino Uno, etc.) for receiving data from the plurality of sensors, and an embedded computing board having an accelerated machine learning engine (e.g., NVIDIA Jetson Nano, etc.). As an option, some or all processors may also comprise conventional cooling systems (e.g., fans, heat sinks, Peltier coolers, etc.) allowing them to operate in the extreme temperature they are intended to observe.

Figure 2:
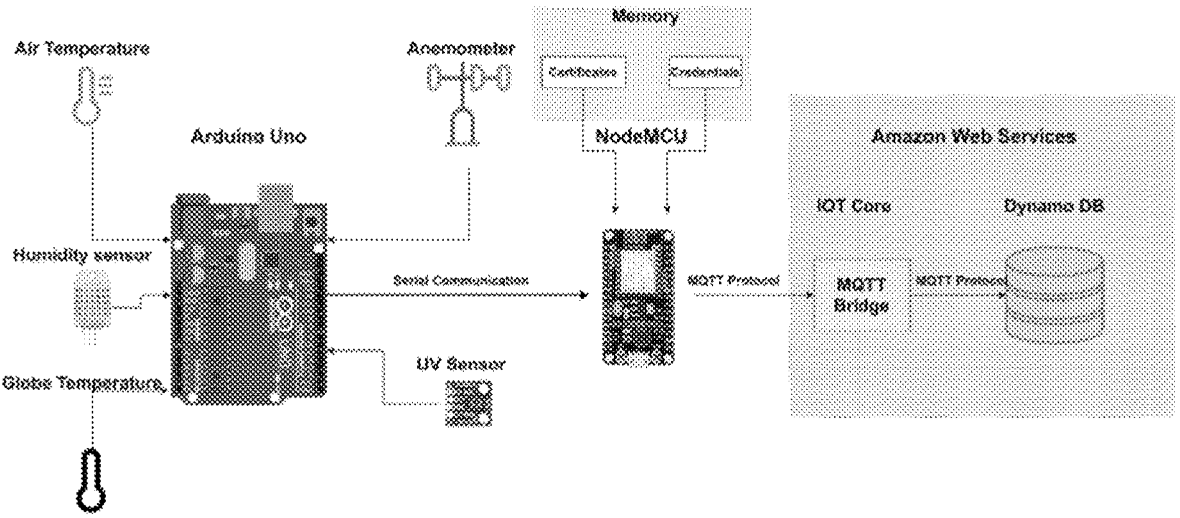
FIG. 2 is a block diagram of the MaRTiny setup along with communication protocols. Five sensors are configured to an Arduino Uno microcontroller and the collected data is transmitted to NodeMCU using Serial Communication, which is further sent to an AWS external server database using the MQTT Protocol.

FIG. 2 is a schematic view of a non-limiting example of the instant BSD. As shown in this specific but non-limiting example, in some embodiments, five sensors are communicatively coupled to a first microcontroller (e.g., Arduino Uno) and the collected data is then transmitted to a second microcontroller (e.g., NodeMCU) using Serial Communication (or other protocol known in the art) which is then transmitted to an external server (e.g., AWS database) using MQTT Protocol.

As shown, the BSD is configured with multiple types of sensors to collect meteorological data every minute. These sensors may include, but are not limited to, multiple temperature probes/thermometers, UV sensors, humidity sensors, and anemometers (e.g., wind speed sensor). Two temperature probes shown in FIG. 2 are utilized for globe and air temperature, respectively.

As previously discussed, in some embodiments, globe temperature is measured using a grey ping-pong ball attached on top of its probe. The grey color of the globe almost matches the albedo of the human skin. The globe thermometer and the derived MRT emulate emulates the omnidirectional thermal exposure for a human body as a function of radiation, air temperature, and velocity, thus providing an accurate low-cost solution to net radiometers. In some embodiments, air temperature is measured using a downward hanging white cup that shades the attached temperature probe. The white cup reflects most of the solar radiation instead of absorbing it to provide an air temperature "free" from the influence of solar radiations. Other embodiments may employ other structures and methods to obtain a shielded air temperature free from solar influence. The UV sensor is used to measure the UV intensity and train the machine learning model to estimate MRT based on all measured parameters. All the sensors except the anemometer and UV sensor are digital in nature. The wind-speed and UV intensity are linearly related to their device's output voltage.

According to some embodiments, the BSD is powered by a DC adapter of 5V/4A or other suitable adapter, which is shared by both the weather station and the vision system. The anemometer may be supplied with 9V power by stepping up the primary voltage source. This setup can be easily scaled with more sensors without compromising on space and power. In practice, low-cost sensors are subject to noise and variation, which can yield errors in MRT estimation. To solve this problem, some embodiments employ a machine learning model to robustly estimate MRT despite these inaccuracies.

Along with meteorological parameters, the BSD comprises a vision system whose capabilities include object detection and identification as well as shade detection in outdoor areas. As a specific example, in one embodiment, the NVIDIA Jetson Nano is used, which is a low-cost and low-powered edge device capable of running state-of-the-art deep learning models. The Jetson Nano features an ARM-based microprocessor built with a Nvidia V100 GPU that is programmed through Nvidia's low level API Tensor$^{RT}$ engine. A compact MIPI (Mobile Industry Processor Interface) camera is used to capture video and stream the data to the Jetson Nano using a gstreamer pipeline. Vision data may be sent to AWS via an external USB WIFI on-board. Those skilled in the art will recognize that other embedded computer boards and machine learning engines, and/or network interfaces and protocols may be employed in other embodiments without departing from the instant BSD.

Reading and processing the meteorological sensor data is performed using a cost-effective microcontroller such as an Arduino Uno. In some embodiments, the Uno board communicates with a NodeMCU micro-controller featuring an ESP8266 architecture that has an inbuilt WIFI module, flash memory, and supports the PEM (Privacy Enhanced Mail) file system. Sensor data is continuously read in a loop by the Uno board with a small delay of Ims to avoid overheating, according to some embodiments. Records are collected in a buffer, and an average is calculated for every minute, which is then transmitted to the NodeMCU board. On average, the Uno acquires around 80 readings per minute in this specific embodiment. Both boards make use of the serial communication protocol UART (Universal Asynchronous Receiver/Transmitter) to communicate with each other, as is known in the art. The NodeMCU communicates securely with the online database.

Some embodiments may utilize AWS DynamoDB, which is a NoSQL database. Unlike traditional relational database systems, NoSQL can handle unstructured data, making it very flexible. All the necessary security PEM files are stored in the flash memory of NodeMCU, which is required during authentication of the BSD. Using these files, NodeMCU establishes a communication path with AWS through the MQTT protocol. MQTT is an extremely lightweight publish/subscribe messaging protocol designed for IoT communication. Once the communication is established, Node MCU waits for bytes of data to be received from the Uno board. Sensor data collected by Uno is sent to NodeMCU via serial communication every minute, which is then transmitted to DynamoDB using the MQTT protocol.

Some embodiments of the BSD employ advanced machine learning capabilities on-board the device, to fully interpret and analyze the meteorological sensor data and captured images. An accurate MRT is robustly estimated from the sensor data via supervised learning with SVM (Support Vector Machine) and ANN (Artificial Neural Network) models. Additionally, deep learning models for people detection and shade identification in images are implemented. The BSD uses a novel method to detect pedestrians in shade, allowing the device to count people in shade automatically. To preserve privacy, images taken by the BSD may be used only for detection purposes and are not stored on the device memory or in the cloud, which would not be feasible without the on-board machine vision capabilities of the instant device.

As previously discussed, the instant BSD is a low-cost, compact alternative to the expensive, conventional solutions such as the MaRTy sensing platform. However, the replacement of highly accurate sensors has drawbacks including less sensitivity and sensor lag. Inaccuracies introduced here can cause serious errors in the calculated MRT values. To overcome this limitation, some embodiments perform MRT estimation as a supervised learning problem using the validated data from a conventional system to develop a model. This requires labeled ground-truth MRT values to be provided in correspondence with the BSD's less robust meteorological sensor data. The use of machine learning allows the BSD to estimate MRT accurately from the BSD sensor data, despite the drawbacks mentioned.

According to various embodiments, the BSD employs both a traditional machine learning method using SVM model with three different kernels as well as deep learning method by using an ANN model to perform this supervised learning task. These two algorithms are one of the most versatile and well-known algorithms in machine learning as they follow universal approximation theorem. In particular, it has been observed that an SVM with RBF (Radial Basis Function) kernel achieves the highest accuracy on an evaluation dataset. This method has the added advantage of being computationally lightweight, so it can be easily deployed onboard (e.g., using the NVIDIA Jetson Nano, etc.) the BSD for training and performing inference.

Figure 3:
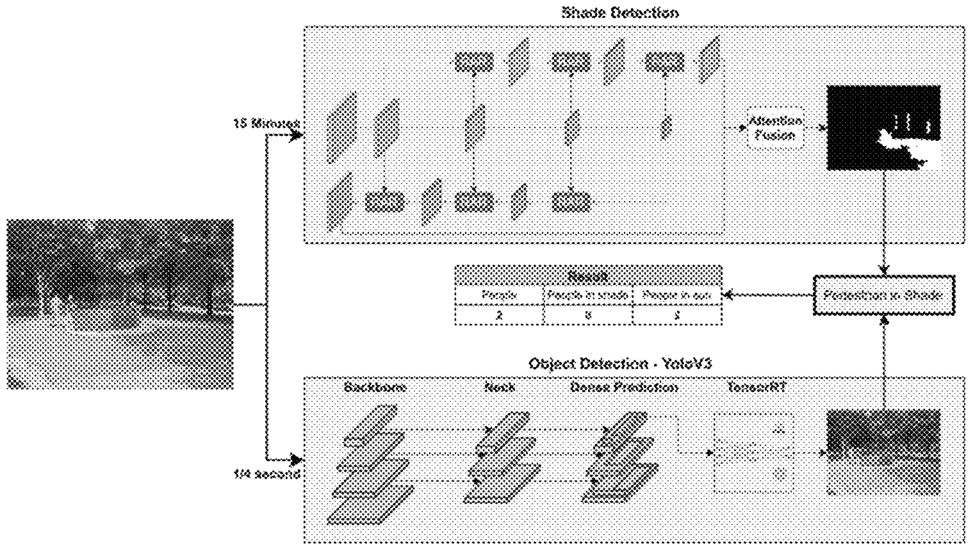
FIG. 3 presents one system overview of the MaRTiny Vision using different types of neural networks. The top network represents the BDRAR network, responsible for shade detection, and the bottom network represents Yolov3. A shade map and bounding box of pedestrians is fed into the pedestrian algorithm to check the number of people in shade and sun.

FIG. 3 is a system overview of a non-limiting example of the BSD machine vision applying different types of deep learning models. The top network represents a BDRAR network, responsible for shade detection, and the bottom network represents Yolov3. As will be discussed below, the shadow map and bounding box of the pedestrian is fed into the pedestrian algorithm to check the number of people in the shade and sun.

According to various embodiments, the BSD leverages deep learning models to detect people in the shade and sun. Ideally, the models need to fit onto the onboard embedded computing board (e.g., NVIDIA Jetson Nano, etc.) or other processor, and they need to be able to process frames coming from the MIPI camera with a frame rate of at least 1 fps. To perform shadow detection in an image, the BSD uses the deep learning model Bi-directional Feature Pyramid with Recurrent Attention Residual Modules (BDRAR), visualized in the upper branch of FIG. 3. BDRAR network takes a single image as input and outputs a binary shadow map as output in an end-to-end manner. First, it leverages a convolutional neural network (CNN) to extract feature maps at different spatial resolutions. It then employs two series of recurrent attention residual modules to fully exploit global and local context for these feature maps. The features captured by shallow layers exploit shadow details in the local regions and the features captured by deep layers understands the overall shadow region of the image.

For object detection, various embodiments of the BSD utilize the state-of-the-art Yolov3 network visualized in the lower branch of FIG. 3. The model is trained on 80 different classes of the Microsoft COCO dataset. The Yolov3 algorithm used by the BSD in some embodiments is built using the Darknet framework. Yolov3 has a mAP (mean Average purpose) of around 57 and has been proven to be efficient in crowded places. Since the YOLOv3-darknet model is large and computationally expensive to run on the NVIDIA Jetson Nano, in some embodiments it is converted into a simple neural graph using Nvidia's TensorRT. This allows the model to run successfully on the Nano with a framerate of 4 fps.

An image represents a three-dimensional environment as two-dimensional data, limiting the ability to determine the exact location of a pedestrian on the ground and their distance from the camera. Some embodiments of the instant BSD are configured to identify pedestrians in shade without determining the position in 3D space. First, a binary shadow map from BDRAR indicating the presence of shade per pixel is computed periodically (e.g., every 15 minutes as shade does not vary significantly in such a short time). For every frame from the MIPI camera, Yolov3 outputs objects with their bounding boxes consisting of pixel coordinates for the corners. The instant BSD calculates the IOU (Intersection over Union) of the bounding box with the shadow map. According to various embodiments, the device considers a person to be in shade if 40% of the bounding box region is inside the shadow map (i.e., IOU=0.4).

Figure 5:
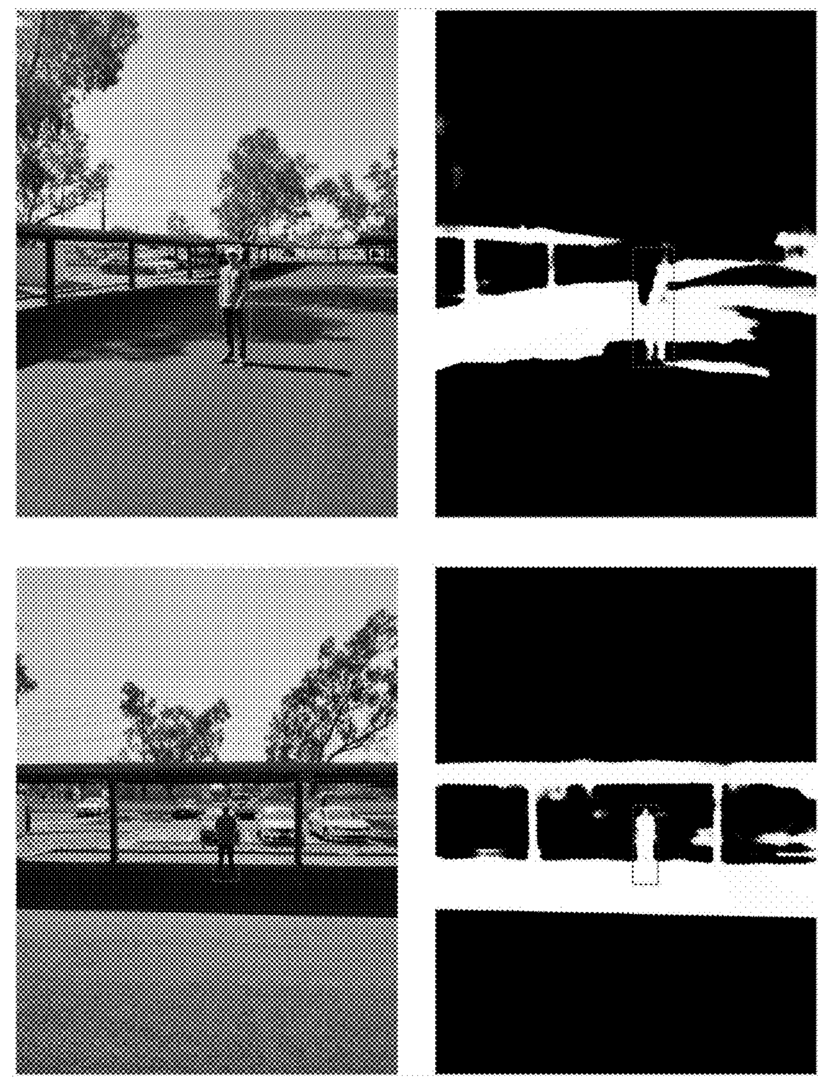
FIG. 5 presents images of a person with bounding box and shadow map of the surroundings. Using our algorithm, we can detect that the person in the first image is sun-exposed and the person in the second scenario is in shade.

Calculating IOU without considering the position of the person with respect to shade can lead to errors. See, for example, FIG. 5, which shows two scenes, one where the person is sun-exposed and the another where the person is in the shade. IOU of the bounding box with the shadow map equals 60% in the first case and 40% in the second case. IOU for the first case is high due to the shade in the background and shadow cast by the person's body. This is the most common type of error that occurs at different orientations and positions of a person; therefore, it is necessary to distinguish between shade from a person and shade from the surroundings. According to various embodiments, the BSD's algorithm first checks if the edge of the bounding box is in the shade. A person does not have to be completely in shade to feel the cooling effect, hence the BSD considers only the bottom half (i.e., 50% of the bounding box) as ROI (Region of Interest). The device then calculates the IOU between this region and the shadow map. According to various embodiments, an IOU of 80% (which implies an IOU of 40% of the complete bounding box) is considered as the optimum value for a person to experience the cooling effects of shade. The ROI and IOU is subjected to change based on the environment and application, but the core logic will remain same.

Examples

System Overview

The MaRTiny system is a compact, Internet-of-Things (IoT), low-cost sensing and vision/recording/surveying platform (see FIG. 1). Its primary functionality is to measure MRT for a given sun-exposed location using off-the-shelf meteorological sensors and a custom-made globe thermometer. MaRTiny measures air temperature, relative humidity, wind speed, and globe temperature, which are used to calculate MRT (see Eq. (2)). In addition, MaRTiny is outfitted with a camera to detect and count people in the shade and Sun. This data helps analyze pedestrian behavior in public spaces (e.g., identifying the number of people who utilize shade, umbrella, bicycles and transportation etc.). Privacy can be preserved by only storing quantitative metrics (e.g., pedestrian count) and discarding the captured images after analysis.

The entire system transmits data to a cloud database via WiFi. It is powered by a single power source of 20 W which is split among different components according to their power ratings. MaRTiny was built for under $200 using different micro-controllers and AI edge devices. MaRTiny is a useful scientific platform to capture MRT data and correlate it with pedestrian behavior in outdoor settings at a fraction of the size/cost of existing solutions. No active human labor is needed for data collection which helps save funds, time, and heat exposure for researchers.

MaRTiny has four types of sensors to collect meteorological data every minute—multiple temperature probes/thermometers, UV sensor, humidity sensor, and anemometer (wind speed sensor) (see FIG. 2 and Tables 1 and 2 for details). Two temperature probes are utilized for globe and air temperature respectively. Globe temperature is measured using a gray ping-pong ball attached on top of its probe. The globe's gray color almost matches the albedo of the human skin. The globe thermometer and the derived MRT emulate the omnidirectional thermal exposure for a human body as a function of radiation, air temperature, and velocity, and thus are an accurate low-cost solution to net radiometers (Thorsson et al., 2006). Air temperature is measured using a downward hanging white cup that shades the attached temperature probe. The white cup reflects most of the solar radiation instead of absorbing it to provide an air temperature "free" from the influence of solar radiations. The UV sensor is used to measure the UV intensity and train the machine learning model to estimate MRT based on all measured parameters. MaRTiny is powered by a DC adapter of 5V/4A, which is shared by both systems (weather station and vision system). The anemometer is supplied with 9 V power by stepping up the primary voltage source. This setup can be easily scaled with more sensors without compromising on space and power. In practice, low-cost sensors are subject to noise and variation, which can yield errors in MRT estimation using Eq. (2) as we show later in Section 5. To solve this problem, we introduce a machine learning model to robustly estimate MRT despite these inaccuracies.

TABLE 1

List of Meteorological Parameters Measured by MaRTiny.

| Meteorological Parameters | | |
|---|---|---|
| Parameter | Description | Unit |
| Ta | Temperature of the surrounding air. | ° C. |
| Tg | Temperature in the gray globe | ° C. |
| UV | Medium and long wave UV radiation | $mW/cm^2$ |
| RH | Relative humidity | % |
| WS | Wind speed | m/s |

Along with meteorological parameters, MaRTiny requires vision capabilities including object detection and identification as well as shade detection in outdoor areas. We leverage the NVIDIA Jetson Nano, a low-cost and low-powered edge device to run state-of-the-art deep learning models. The Jetson Nano features an ARM-based micro-processor built with a Nvidia V100 GPU programmed through Nvidia's low level API TensorRT engine. It has configurable power consumption modes of 5 W and 10 W. As we perform computationally heavy tasks, we have configured the Jetson Nano to 10 W mode. To capture video, we utilize a compact MIPI (Mobile Industry Processor Interface) camera and stream the data to the Jetson Nano using a gstreamer pipeline. Vision data is sent to AWS via an external USB WiFi on-board. In the next section, we describe in detail our deep learning networks to detect pedestrians in shade.

To read meteorological sensor data, we use an Arduino Uno microcontroller. The Uno board communicates with a NodeMCU micro-controller featuring an ESP8266 architecture that has an inbuilt WiFi module, flash memory, and supports the PEM (Privacy Enhanced Mail) file system (see FIG. 2). Sensor data are continuously read in a loop by the Uno with a small 1 ms delay to avoid overheating. Data are collected in a buffer, and an average is calculated for every minute, which is then transmitted to the NodeMCU board. The Uno acquires around 80 readings per minute. Both boards communicate via the serial communication protocol UART (universal Asynchronus Receiver/Transmitter).

TABLE 2

List of Electrical MaRTiny Parts, Costs, and Meteorological Sensor Accuracies.
Part List

| Sensor | Part No. | Cost | Accuracy |
|---|---|---|---|
| Temperature Probe | DS18B20 | 9 | +/−0.5° C. from −10° C. to +85° C. |
| Humidity Sensor | DHT22 | 5 | 2-5% from 0 to 100% |
| UV Sensor | ML8511 | 5 | 1% |
| Anemometer | Adafruit | 40 | Worst case 1 m/s |
| Arduino | Uno | 20 | |
| Node MCU | ESP8266 | 7 | |
| CAI Camera | IMX210 | 20 | |
| Nividia Jetson | Jetson Nano | 108 | |

The NodeMCU communicates securely with the online database. We utilize AWS DynamoDB, a NoSQL flexible database that can handle unstructured data. All the necessary security PEM files are stored in the NodeMCU's flash memory for authentication of MaRTiny. Using these files, NodeMCU establishes a communication path with AWS through the MQTT protocol, an extremely lightweight publish/subscribe messaging protocol designed for IoT. Once the communication is established, Node MCU waits for bytes of data to be received from the Uno board. Sensor data collected by Uno is sent to NodeMCU via serial communication every minute, which is then transmitted to DynamoDB using the MQTT protocol.

Machine Learning Algorithm Development

Figure 7:
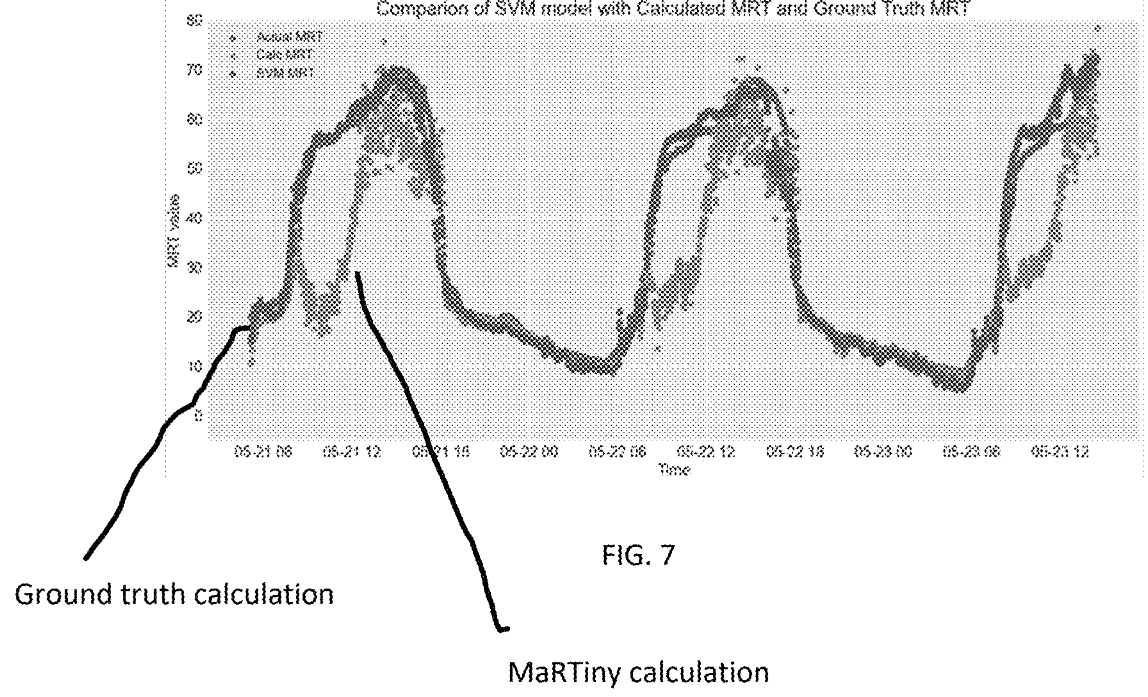
FIG. 7 presents part I of performance of MaRTiny weather station along with trained ML model tested between May 21, 2021 to May 23, 2021 in Tempe, Arizona. Comparison of calculated MRT values with SVM model. Note the dips in the calculation due to the shading effects of the environment experienced by the MaRTiny system, which is corrected by the SVM Model.

As MaRTiny is a low-cost, compact alternative to the MaRTy sensing platform (Middel and Krayenhoff, 2019; Middel et al., 2020, 2021), the replacement of highly accurate sensors has drawbacks including less accuracy and sensor lag (Hab et al., 2015). We noticed these inaccuracies caused serious errors in the calculated MRT values (FIG. 7). In particular, MRT was sensitive to the positioning and orientation of the MaRTiny relative to MaRTy (e.g., the MaRTiny was shaded in one of the test, which resulted in lower MRT values, while MaRTy's net radiometers were partially sun-exposed).

To overcome this limitation, we formulate MRT estimation as a supervised learning problem. This requires labeled ground-truth MRT values to be provided in correspondence with our less robust meteorological sensor data. Below, we discuss data collection consisting of paired MaRTy and MaRTiny measurements to create this labeled data. This allows us to train a machine learning model to estimate MRT accurately from MaRTiny sensor data. We explored both traditional machine learning methods using a support vector machine (SVM) as well as a deep learning-based artificial neural network. These two algorithms are versatile and well-known in machine learning as they satisfy universal approximation theorems (Cybenko, 1989; Hammer and Gersmann, 2002). In particular, we observed an SVM with RBF (Radial Basis Function) kernel achieved the highest accuracy on our evaluation dataset below. This method is also computationally lightweight and can be easily deployed on the Jetson Nano for performing inference, i.e., the process of using a trained machine learning algorithm to make a prediction.

Figure 4:
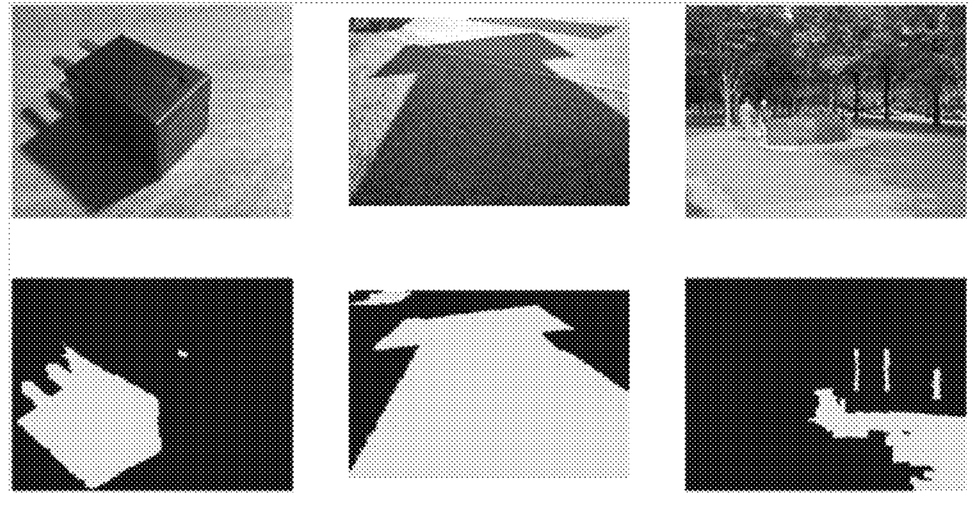
FIG. 4 presents examples of shadow maps produced by the BDRAR network. The network works well for dark pixels without mistaking them for shade.

To perform shadow detection in an image, we use the deep learning model Bi-directional Feature Pyramid with Recurrent Attention Residual Modules (BDRAR) (Zhu et al., 2018), visualized in the upper branch of FIG. 3. BDRAR network takes a single image as input and outputs a binary shadow map as output in an end-to-end manner. First, it leverages a convolutional neural network (CNN) to extract feature maps at different spatial resolutions. It then employs two series of recurrent attention residual modules to fully exploit global and local context for these feature maps. The features captured by shallow layers exploit shadow details in the local regions and the features captured by deep layers understands the overall shadow region of the image. FIG. 4 provides an example of shadow maps produced by the network.

System Evaluation

Figure 6:
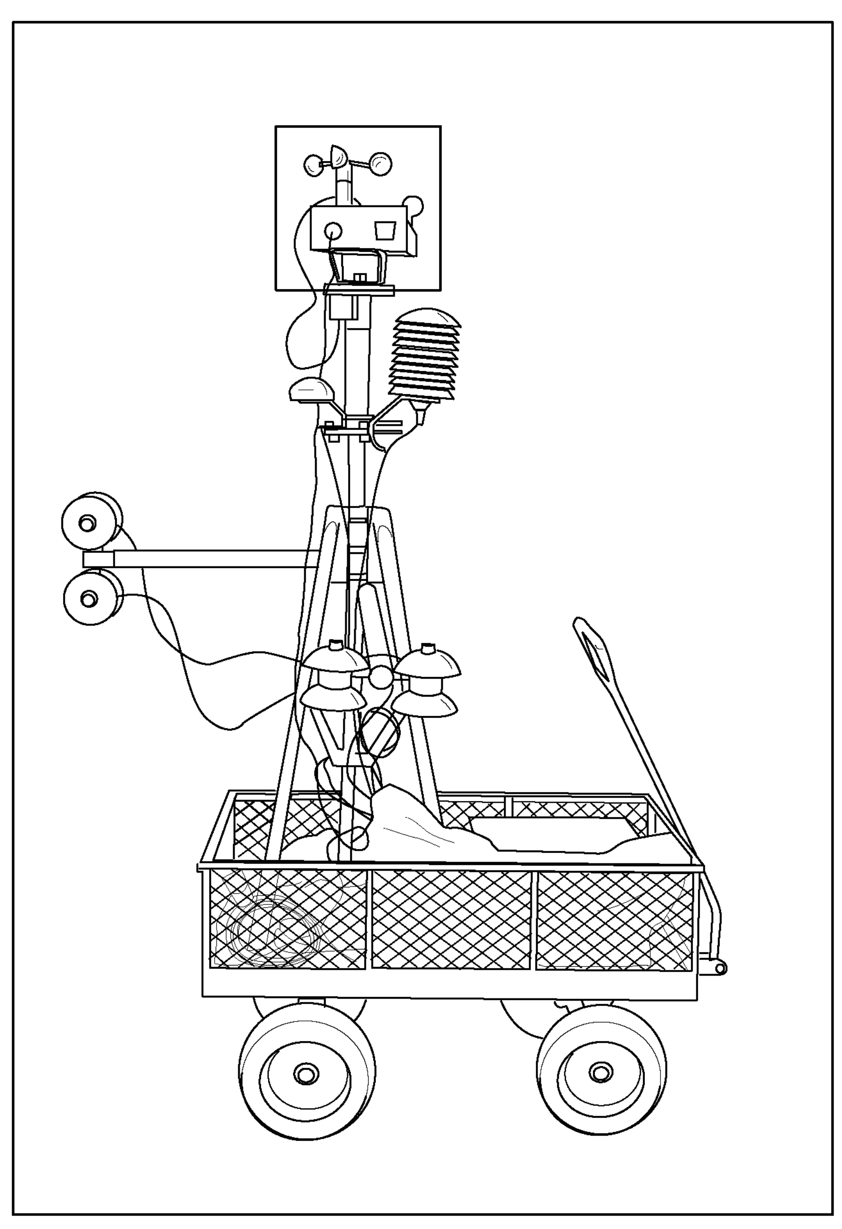
FIG. 6 shows one MaRTy and MaRTiny setup. The top white box corresponds to MaRTiny, and the entire bottom setup corresponds to the MaRTy human-biometeorological platform.

For evaluation, we collected a custom dataset of ground truth MRT values for two sun-exposed outdoor locations for 3 days in Tempe, Arizona, United States. For validation purposes, the MaRTy human-biometeorological platform (Middel and Krayenhoff, 2019) was paired with the MaRTiny system for simultaneous data logging. FIG. 6 illustrates the paired setup, the top box corresponding to MaRTiny and the bottom setup corresponds to MaRTy. We can clearly see the difference in scale between both the setups. In addition, an image dataset was collected for evaluating object and shade detection. Images from the MIPI camera were stored at random intervals along with the bounding boxes of the interested objects. Ground truth bounding boxes were drawn manually using tools such as AlexyAB, (2016); Tosmonav, (2020) for 30 images consisting of around 50 different objects. Precision and Recall for each object were calculated and then used to calculate mAP (mean Average Precision). The same images were used to evaluate shade detection using IOU (Intersection Over Union) metrics. Small video snippets were stored at random intervals which helped to cross-verify the number of people in a given time frame. All the images and videos were stored in an AWS S3 bucket and were deleted after testing.

We first evaluated the performance of MaRTiny in estimating MRT values. We utilize Eq. 2 with the sensor data on-board to calculate MRT. MaRTy logs data every 2 s, and MaRTiny stores data every minute, hence we calculated 1-min averages for comparison. Ground truth MRT was calculated using Eq. 1. FIG. 7 shows MaRTiny MRT results and MaRTy's ground truth calculation as labeled in the figure. A significant error in MaRTiny's estimation of MRT was found in the mornings with an MSE of around 10° C. The error is due to the spatial offset between the two devices, which caused the gray globe thermometer of the MaRTiny sensor to be partially shaded by a nearby palm tree in the mornings while MaRTy's net radiometers were sun-exposed. A palm tree has a narrow shadow pattern covering only portions of the whole MaRTy and MaRTiny setup (see FIG. 6).

To overcome these issues, we utilized our supervised learning approach using both SVM and ANN. Machine learning models were trained on selected meteorological parameters-air temperature, globe temperature, humidity and UV intensity, which were comparatively more accurate and less prone to noise. We used around 12,000 data points for training and 3,000 for testing from a range of dates, times, and locations in the sensing period. These training points were fed as vectors into the scikit-learn package in Python for training SVMs and ANNs. 5-fold cross-validation was used to tune model hyperparameters such as learning rate. A separate dataset for evaluation consisted of around 700 data points from a single location collected in a day as is the usual application for this algorithm.

Figure 8:
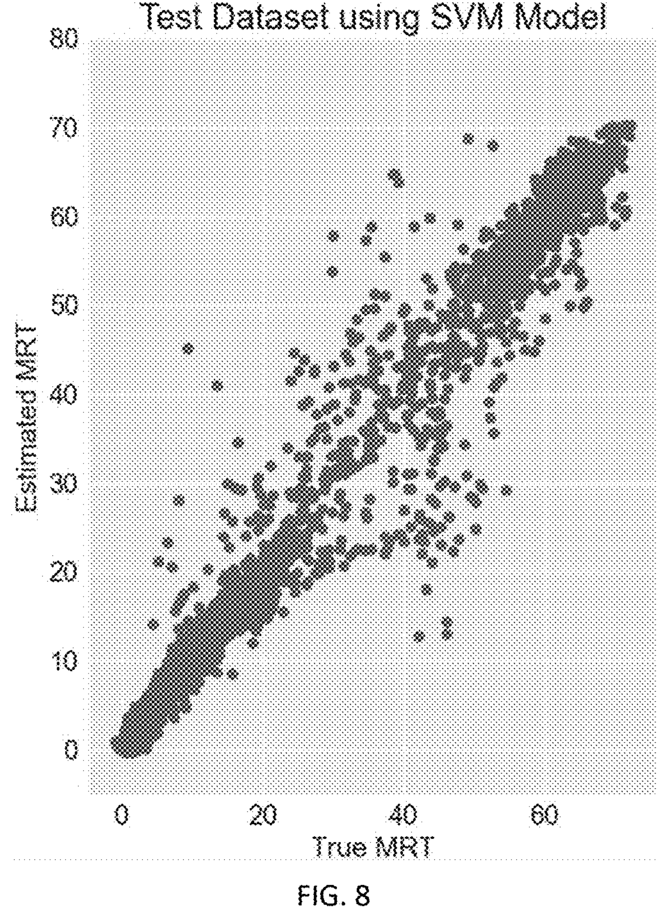
FIG. 8 presents part II of performance of MaRTiny weather station along with trained ML model tested between May 21, 2021 to May 23, 2021 in Tempe, Arizona. Performance of SVM Model on test dataset, which is almost linear with observations.

Since there is a non-linear relation of globe temperature and air temperature with MRT given in Eq. 2, machine learning models need to understand complex non-linear relations between these parameters. A SVM with RBF kernel and a neural network with ReLU (Rectified Linear Unit) activation function are example of such models. In Table 3, we present a comparison of SVMs with three different kernels and a traditional artificial neural network (ANN). We report the Root Mean Square Error (RMSE) for both the testing and evaluation datasets. Note that the results of linear and polynomial SVM kernels justify our earlier assumption and the results of SVM with RBF kernel as well as the ANN achieved the best performance in quantitative metrics. From FIG. 8 we can see the performance of SVM with RBF kernel, which is almost linear with the ground truth.

TABLE 3

Performance of Different Supervised Machine Learning Models for MRT Estimation.
Machine earning Algorithms for MRT

| Algorithm | RMS-Test | RMS-Eval |
|---|---|---|
| SVM-Linear | 16.8 | 20.2 |
| SVM-Poly | 12.0 | 10.0 |
| SVM-RBF | 4.6 | 3.9 |
| ANN | 3.2 | 3.8 |

We trained our ANN on a i7 CPU. We set our learning rate a to 0.001, which took around 5 min and 300 epochs to converge.

Although this model performs slightly better on the test dataset than the SVM-RBF model, performance is identical on the evaluation dataset. The SVM model is also computationally lighter and can be easily trained and deployed on edge devices such as Jetson Nano.

For object detection, we leverage the YOLOv3 architecture (Redmon and Farhadi, 2018). While not a state-of-the-art object detector, this model is computationally lightweight in comparison to more modern object detection models. Further, the object detector needed to be compatible with both the TensorRT engine which we utilize on the NVIDIA Jetson board as well as the Python dependencies and packages necessary to run BDRAR as well as itself. Future research could investigate the optimal choice of object detector with shade detection (or a joint-model) for enhanced application performance. Although the model is out-of-box, we wanted to evaluate its performance in the environment suitable for the MaRTiny device and hence, we collected a small custom dataset and evaluated performance on these images. This evaluation on custom dataset should only be considered as a secondary evaluation while we still refer the reader to the main evaluation mentioned in the original study (Redmon and Farhadi, 2018) for the full performance of the object detector.

Figure 9:
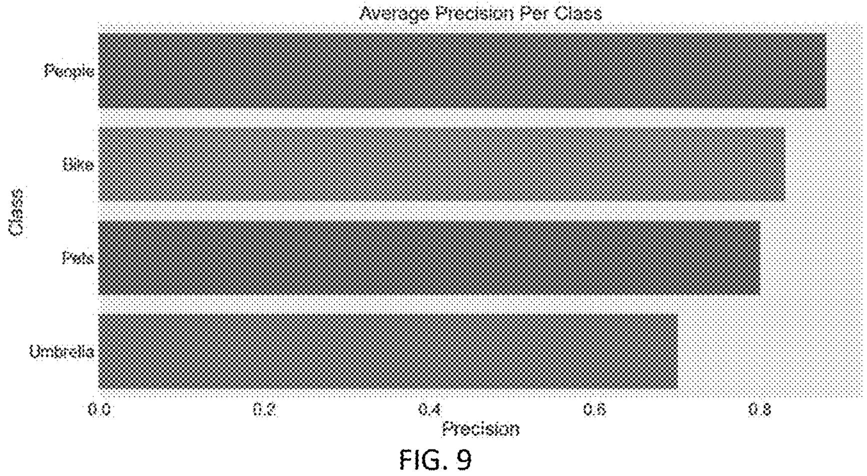
FIG. 9 presents a graph showing the performance of object detection on different classes of images collected during evaluation.

The standard evaluation metric used for any object detection is mAP (mean Average Precision). Bounding boxes were manually drawn using the tool for the dataset consisting of 30 images and IOU was calculated with the bounding boxes predicted by our model. Precision and recall is calculated for a series of different IOU thresholds ranging from 0.5 to 0.95. A precision-recall graph is constructed and the area under this graph provides us the mAP value of around 55%, which is close to the value reported in their study (Redmon and Farbadi, 2018). For our application IOU threshold of 0.5 gives us the optimal results. We also achieved an Average Precision of more than 85% for the class of Pedestrian, which is important for our application (FIG. 9).

Figure 10:
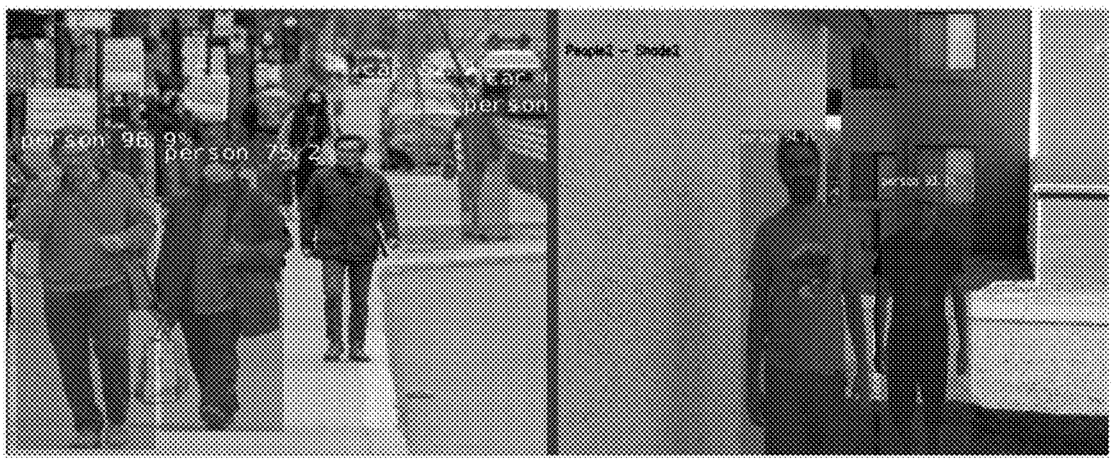
FIG. 10 shows an example of pedestrian detection along with masks using Yolov3 algorithm (left) and MaRTiny performing pedestrian detection in shade and sun (right).
Figure 11:
FIG. 11 shows sample images of shade detection and pedestrian counting. The top two rows are example of shade map estimation carried at different time and environments (trees, buildings, empty spaces) and last row has sample images captured by MaRTiny for object detection (pedestrian and bike).

Evaluation of shadow detection is done on a per pixel basis, which is a binary evaluation method. A dataset consisting of 30 shade images was collected from different location and time. We manually annotated these images using the tool Tosmonav, (2020). We use the pre-trained BDRAR model to evaluate these images and calculated IOU of the shadow map with the ground truth and found a precision of 90%. This is not the most effective method to calculate model accuracy due to the irregular shapes, human error in annotation and small dataset and hence we also refer readers to the evaluation metrics of the original paper (Zhu et al., 2018). We evaluate our pedestrian in shade detection algorithm on a custom dataset of 50 images collected using MaRTiny. We have manually compared the detected values from our algorithm with the ground truth and plotted a confusion matrix to obtain an accuracy of around 80%. Test data consisted of different shading effects and relative positions of pedestrian. Since this kind of testing has not been carried out before, our result can act as a baseline for future tests. The accuracy can be improved on edge cases where pedestrian is partially exposed to Sun at different orientations. FIG. 10 and FIG. 11 provides examples of MaRTiny Vision where YOLOv3 detects different objects and works along with BDRAR to determine if a pedestrian is in shade or sun.

DISCUSSION

This system engineering study introduced a novel low-cost device that combines meteorological sensing with computer vision to estimate MRT and space use. While previous work has mainly focused on assessing the accuracy and precision of various sensors and on advancing MRT simulation tools, the instant disclosure, in some aspects, focuses on developing a low-cost hardware and software setup that can be used by non-experts such as city staff and citizen scientists. We also explored the use of state-of-the-art machine learning techniques to improve MRT estimation from low-cost sensors.

This description introduces the setup of the novel MaRTiny system to monitor biometeorological conditions and people's use of public spaces with changing weather conditions. An empirical study must follow to collect robust data over a long period of time to systematically analyze the relationship between thermal conditions and space usage. In addition, the MaRTiny biometeorological setup must be fully calibrated against NIST certified sensors before deployment, as it is built using off-the-shelf sensors with low accuracy (see Table 2).

While an RMSE of 10° C. between 6-directional MRT observations and globe temperature derived MRT may seem large, it is on the order of magnitude of errors reported by other authors and quite common for outdoor MRT measurements in heterogeneous built environments. Acero et al. (2021) found an RMSE of 7.4° C. for the standard ISO7726 coefficient between the 6-directional setup and a standard black globe. Vanos et al. (2021) found an average difference of −1.6±7.2° C. between an acrylic gray globe and integral radiation measurements on a solar roof that was not subject to shading from the surrounding built environment. Most recently, Lee et al. (2022) reported a large mean difference of 13.2-21.6° C. on sunny days between globe thermometer MRT and traditional MRT measurements.

Globe thermometers have various shortcomings, mostly related to the indirect measurement of incident radiative fluxes, which is highly sensitive to globe size, shape, material properties/assumptions, color, and wind speed (Vanos et al., 2021). Guo et al (2018) and Chen et al (2014) found significant impacts of wind speed on MRT obtained from globe thermometers, and Teitelbaum et al. (2020) point to errors from free convection. Globe thermometers also have a long response time (Nikolopoulou et al., 1999) that grows with globe diameter. MaRTinies are operated in stationary settings, which reduces the error, but they will not be able to respond quickly to changing cloud conditions. Lastly, globe thermometers are known to overestimate MRT during high incoming solar radiation periods and an underestimate at low solar elevation (Thorsson et al., 2006; Acero and Herranz-Pascual, 2015; Vanos et al, 2021).

Advancements in sensor technology have led to smaller, more portable, and more affordable sensors that facilitate low-cost sensing for many applications. In the domain of urban climate, low-cost sensing has gained popularity for crowdsourcing and citizen science studies, but is also increasingly used to build IoT sensor networks, for example, to monitor air pollution (Xiaojun et al., 2015) or thermal conditions in occupational settings (Sulzer et al., 202.2).

MaRTiny leverages edge devices that are low-cost, low-powered, and yet computationally capable of running state-of-the-art machine learning algorithms. Integrating a vision system and people detection into the biometeorological sensing system enables in-depth analyses of how weather and microclimate conditions impact people's walking behavior in public spaces, including the use of shaded and sun-exposed areas. Once calibrated, the system will be deployed in City of Tempe parks and at playgrounds to inform municipal decision-making on targeted investments for cooling infrastructure in public spaces. The MaRTiny system is an example of how the emerging field of Urban Climate Informatics can support heat mitigation efforts through non-traditional observational methodologies.

Pedestrian count under sun and shade along with other relevant counts (umbrellas, pets, and bicycles) are reported to the online database via the microcontroller or other processor that is communicatively coupled to the database, and the frame with identifying features is discarded. This allows the BSD to preserve the privacy of the individuals being observed, which is necessary for public deployment of the sensing platform.

It will be understood that implementations are not limited to the specific components disclosed herein, as virtually any components consistent with the intended operation of a method and/or system implementation of a biometeorological sensing device may be utilized. Accordingly, for example, although particular processors, algorithms, protocols, devices, and sensors may be disclosed, such components may comprise any shape, size, style, type, model, version, class, grade, measurement, concentration, material, weight, quantity, and/or the like consistent with the intended operation of a method and/or system implementation for a biometeorological sensing device may be used. In places where the description above refers to particular implementations of a biometeorological sensing device, it should be readily apparent that a number of modifications may be made without departing from the spirit thereof and that these implementations may be applied to other biometeorological sensing devices.

REFERENCES

Acero, J. A., Dissegna, A., Tan, Y. S., Tan, A., and Norford, L. K. (2021). Outdoor Performance of the Black Globe Temperature Sensor on a Hot and Humid Tropical Region. Environ. Technol., 1-13. doi:10.1080/09593330.2021.1989057

Acero, J. A., and Herranz-Pascual, K. (2015). A Comparison of Thermal Comfort Conditions in Four Urban Spaces by Means of Measurements and Modelling Techniques. Build. Environ. 93, 245-257. doi:10.1016/j.buildenv.2015.06.028

[Dataset] AlexyAB (2016). YOLO_mark. Available at: https://github.com/AlexeyAB/Yolo_mark.

Alfano, F. R. D., Dell'isola, M., Ficco, G., Palella, B. I., and Riccio, G. (2021). On the Measurement of the Mean Radiant Temperature by Means of Globes: An Experimental Investigation under Black Enclosure Conditions. Build. Environ. 193, 107655. doi:10.1016/j.buildenv.2021.107655

Ali-Toudert, F., and Mayer, H. (2007). Thermal Comfort in an East-West Oriented Street Canyon in Freiburg (Germany) Under Hot Summer Conditions. Theor. Appl. Climatol. 87, 223-237. doi:10.1007/s00704-005-0194-4

Aminipouri, M., Rayner, D., Lindberg, F., Thorsson, S., Knudby, A. J., Zickfeld, K., et al. (2019). Urban Tree Planting to Maintain Outdoor Thermal Comfort Under Climate Change: The Case of Vancouver's Local Climate Zones. Build. Environ. 158, 226-236. doi:10.1016/j.buildenv.2019.05.022

Arens, E., and Bosselmann, P. (1989). Wind, Sun and Temperature-Predicting the Thermal Comforf of People in Outdoor Spaces. Build. Environ. 24, 315-320. doi: 10.1016/0360-1323(89)90025-5

Brostow, G. J., and Cipolla, R. (2006). Unsupervised Bayesian Detection of Independent Motion in Crowds. USA: IEEE Computer Society.

Brown, R. D. (2019). Correcting the Error in Measuring Radiation Received by a Person: Introducing Cylindrical Radiometers. Sensors 19, 5085. doi:10.3390/s19235085

Bruse, M., and Fleer, H. (1998). Simulating Surface-Plant-Air Interactions inside Urban Environments with a Three Dimensional Numerical Model. Environ. Model. Softw. 13, 373-384. doi:10.1016/S1364-8152(98)00042-5

Chan, A. B., Zhang-Sheng John Liang, J., and Vasconcelos, N. (2008). "Privacy Preserving Crowd Monitoring: Counting People without People Models or Tracking," in Computer Vision and Pattern Recognition. doi:10.1109/CVPR. 2008.4587569

Chen, K., Gong, S., Xiang, T., and Change Loy, C. (2013). "Cumulative Attribute Space for Age and Crowd Density Estimation," in Proceedings of the IEEE Conference on Computer Vision and Pattern Recognition (CVPR). doi: 10. 1109/cvpr.2013.319

Chen, K., Loy, C. C., Gong, S., and Xiang, T. (2012). "Feature Mining for Localised Crowd Counting," in Proceedings of the British Machine Vision Conference (BMVA Press), 21. doi:10.5244/C.26.21

Chen, Y.-C., Lin, T.-P., and Matzarakis, A. (2014). Comparison of Mean Radiant Temperature from Field Experiment and Modelling: a Case Study in Freiburg, Germany. Theor. Appl. Climatol. 118, 535-551. doi:10.1007/s00704-013-1081-z Colter, K. R., Middel, A. C., and Martin, C. A. (2019). Effects of Natural and Artificial Shade on Human Thermal Comfort in Residential Neighborhood Parks of Phoenix, Arizona, USA. Urban For. Urban Green. 44, 126429. doi:10. 1016/j.ufug.2019.126429

Coutts, A. M., White, E. C., Tapper, N. J., Beringer, J., and Livesley, S. J. (2016). Temperature and Human Thermal Comfort Effects of Street Trees across Three Contrasting Street Canyon Environments. Theor. Appl. Climatol. 124, 55-68. doi:10.1007/s00704-015-1409-y Crank, P. J., Middel, A., Wagner, M., Hoots, D., Smith, M., and Brazel, A. (2020). Validation of Seasonal Mean Radiant Temperature Simulations in Hot Arid Urban Climates. Sci. Total Environ. 749, 141392. doi:10.1016/j.scitotenv.2020. 141392

Cybenko, G. (1989). Approximation by Superpositions of a Sigmoidal Function. Math. Control Signal Syst. 2, 303-314. doi:10.1007/BF02551274

Dalal, N., and Triggs, B. (2005). "Histograms of Oriented Gradients for Human Detection," in 2005 IEEE Computer Society Conference on Computer Vision and Pattern Recognition (CVPR'05), 886-893. doi:10.1109/CVPR.2005.177

Depatla, S., Muralidharan, A., and Mostofi, Y. (2015). Occupancy Estimation Using Only Wifi Power Measurements. IEEE J. Sel. Areas Commun. 33, 1381-1393. doi:10.1109/JSAC.2015.2430272

Eliasson, I., Knez, I., Westerberg, U., Thorsson, S., and Lindberg, F. (2007). Climate and Behaviour in a Nordic City. Landsc. Urban Plan. 82, 72-84. doi:10.1016/j. landurbplan.2007.01.020

Emmanuel, R., Rosenlund, H., and Johansson, E. (2007). Urban Shading-A Design Option for the Tropics? A Study in Colombo, Sri Lanka. Int. J. Climatol. 27, 1995-2004. doi:10.1002/joc.1609

Eom, S., and Nishihori, Y. (2021). How Weather and Special Events Affect Pedestrian Activities: Volume, Space, and Time. Int. J. Sustain. Transp. 0, 1-31. doi:10.1080/15568318.2021.1897907

Givoni, B., Noguchi, M., Saaroni, H., Pochter, O., Yaacov, Y., Feller, N., et al. (2003). Outdoor Comfort Research Issues. Energy Build. 35, 77-86. doi:10. 1016/S0378-7788(02)00082-8

Guo, H., Teitelbaum, E., Houchois, N., Bozlar, M., and Meggers, F. (2018). Revisiting the Use of Globe Thermometers to Estimate Radiant Temperature in Studies of Heating and Ventilation. Energy Build. 180, 83-94. doi:10.1016/j.enbuild.2018.08.029

Hab, K., Ruddell, B. L., and Middel, A. (2015). Sensor Lag Correction for Mobile Urban Microclimate Measurements. Urban Clim. 14, 622-635. doi:10.1016/j.uclim.2015.10.003

Hammer, B., and Gersmann, K. (2003). A Note on the Universal Approximation Capability of Support Vector Machines. Neural Process. Lett. 17, 43-53. doi:10. 1023/A:1022936519097

Harlan, S. L., Brazel, A. J., Prashad, L., Stefanov, W. L., and Larsen, L. (2006). Neighborhood Microclimates and Vulnerability to Heat Stress. Soc. Sci. Med. 63, 2847-2863. doi:10.1016/j.socscimed.2006.07.030

Hashimoto, Y., Gu, Y., Hsu, L.-T., Iryo-Asano, M., and Kamijo, S. (2016). A Probabilistic Model of Pedestrian Crossing Behavior at Signalized Intersections for Connected Vehicles. Transp. Res. Part C Emerg. Technol. 71, 164-181. doi:10.1016/j.trc.2016.07.011

Hoogendoorn, S. P., and Bovy, P. H. L. (2004). Pedestrian Route-Choice and Activity Scheduling Theory and Models. Transp. Res. Part B Methodol. 38, 169-190. doi:10.1016/S0191-2615(03)00007-9

Höppe, P. (1992). A New Procedure to Determine the Mean Radiant Temperature Outdoors. Wetter und Leben 44, 147-151.

Höppe, P. (1999). The Physiological Equivalent Temperature—a Universal Index for the Biometeorological Assessment of the Thermal Environment. Int. J. Biometeorology 43, 71-75. doi:10.1007/s004840050118

Hsu, Y. W., Chen, Y. W., and Perng, J. W. (2020). Estimation of the Number of Passengers in a Bus Using Deep Learning. Sensors (Basel) 20, 2178. doi:10.3390/s20082178

Jendritzky, G., de Dear, R., and Havenith, G. (2012). UTCI-why Another Thermal Index? Int. J. Biometeorol. 56, 421-428. doi:10.1007/s00484-011-0513-7

Johansson, E., Thorsson, S., Emmanuel, R., and Kruger, E. (2014). Instruments and Methods in Outdoor Thermal Comfort Studies—the Need for Standardization. Urban Clim. 10, 346-366. doi:10.1016/j.uclim.2013.12.002

Kántor, N., and Unger, J. (2011). The Most Problematic Variable in the Course of Human-Biometeorological Comfort Assessment—the Mean Radiant Temperature. Central Eur. J. Geosciences 3, 90-100. doi:10.2478/s13533-011-0010-x Kjaergaard, M. B., Wirz, M., Roggen, D., and Troster, G. (2012). "Mobile Sensing of Pedestrian Flocks in Indoor Environments Using WiFi Signals," in 2012 IEEE International Conference on Pervasive Computing and Communications, PerCom. doi:10.1109/PerCom.2012.6199854

Krüger, E. L., Minella, F. O., and Matzarakis, A. (2014). Comparison of Different Methods of Estimating the Mean Radiant Temperature in Outdoor Thermal Comfort Studies. Int. J. Biometeorol. 58, 1727-1737. doi:10.1007/s00484-013-0777-1

Kuras, E. R., Richardson, M. B., Calkins, M. M., Ebi, K. L., Hess, J. J., Kintziger, K. W., et al. (2017). Opportunities and Challenges for Personal Heat Exposure Research. Environ. Health Perspect. 125, 085001. doi:10.1289/EHP556

Lau, B. P. L., Wijerathne, N., Ng, B. K. K., and Yuen, C. (2018). Sensor Fusion for Public Space Utilization Monitoring in a Smart City. IEEE Internet Things J. 5, 473-481. doi:10.1109/JIOT.2017.2748987

Lee, H., Jo, S., and Park, S. (2022). A Simple Technique for the Traditional Method to Estimate Mean Radiant Temperature. Int. J. Biometeorol. 66, 521-533. doi:10. 1007/s00484-021-02213-x Lee, I., Voogt, J., and Gillespie, T. (2018). Analysis and Comparison of Shading Strategies to Increase Human Thermal Comfort in Urban Areas. Atmosphere 9, 91. doi:10.3390/atmos9030091

Lee, J. M. (2020). Exploring Walking Behavior in the Streets of New York City Using Hourly Pedestrian Count Data. Sustainability 12, 7863. doi:10.3390/su12197863

Lempitsky, V., and Zisserman, A. (2010). "Learning to Count Objects in Images,". Advances in Neural Information Processing Systems. Editors J. Lafferty, C. Williams, J. Shawe-Taylor, R. Zemel, and A. Culotta (Curran Associates, Inc.), 23.

Liu, W., Salzmann, M., and Fua, P. (2019). "Context-aware Crowd Counting," in Proceedings of the IEEE/CVF Conference on Computer Vision and Pattern Recognition (CVPR). doi:10.1109/cvpr.2019.00524

Manavvi, S., and Rajasekar, E. (2020). Estimating Outdoor Mean Radiant Temperature in a Humid Subtropical Climate. Build. Environ. 171, 106658. doi:10.1016/j.buildenv.2020.106658

Masson-Delmotte, V., Zhai, P., Pirani, A., Connors, S., Péan, C., Berger, S., et al. (2021). Ipcc, 2021: Climate Change 2021: The Physical Science Basis. Contribution of Working Group I to the Sixth Assessment Report of the Intergovernmental Panel on Climate Change. Cambridge University Press. Available at: https://www.ipcc. ch/report/sixth-assessment-report-working-group-i/

Matzarakis, A., Rutz, F., and Mayer, H. (2010). Modelling Radiation Fluxes in Simple and Complex Environments: Basics of the RayMan Model. Int. J. Biometeorol. 54, 131-139. doi:10.1007/s00484-009-0261-0

Middel, A., AlKhaled, S., Schneider, F. A., Hagen, B., and Coseo, P. (2021). 50 Grades of Shade. Bull. Am. Meteorological Soc. 1, 1-35. doi:10.1175/bams-d-20-0193.1

Middel, A., Hab, K., Brazel, A. J., Martin, C. A., and Guhathakurta, S. (2014). Impact of Urban Form and Design on Mid-afternoon Microclimate in Phoenix Local Climate Zones. Landsc. Urban Plan. 122, 16-28. doi:10.1016/j. landurbplan.2013.11.004

Middel, A., and Krayenhoff, E. S. (2019). Micrometeorological Determinants of Pedestrian Thermal Exposure during Record-Breaking Heat in Tempe, Arizona: Introducing the Marty Observational Platform. Sci. Total Environ. 687, 137-151. doi:10.1016/j.scitotenv.2019.06.085

Middel, A., Lukasczyk, J., and Maciejewski, R. (2017). Sky View Factors from Synthetic Fisheye Photos for Thermal Comfort Routing-A Case Study in Phoenix, Arizona. Urban Planning 2, 19-30. doi:10.17645/up.v2i.1855

Middel, A., Selover, N., Hagen, B., and Chhetri, N. (2016). Impact of Shade on Outdoor Thermal Comfort-A Seasonal Field Study in Tempe, Arizona. Int. J. Biometeorol. 60, 1849-1861. doi:10.1007/s00484-016-1172-5

Middel, A., Turner, V. K., Schneider, F. A., Zhang, Y., and Stiller, M. (2020). Solar Reflective Pavements-A Policy Panacea to Heat Mitigation? Environ. Res. Lett. 15, 064016. doi:10.1088/1748-9326/ab87d4

Nikolopoulou, M., Baker, N., and Steemers, K. (1999). Improvements to the Globe Thermometer for Outdoor Use. Archit. Sci. Rev. 42, 27-34. doi:10.1080/00038628.1999.9696845

Olesen, B., Rosendahl, J., Kalisperis, L., Summers, L. H., and Steinman, M. (1989). Methods for Measuring and Evaluating the Thermal Radiation in a Room. Ashrae Trans. 95, 1028-1044.

Oliveira, A. V. M., Raimundo, A. M., Gaspar, A. R., and Quintela, D. A. (2019). Globe Temperature and its Measurement: Requirements and Limitations. Ann. Work Expo. Health 63, 743-758. doi:10.1093/annweh/wxz042

Raykov, Y., Ozer, E., Dasika, G., Boukouvalas, A., and Little, M. (2016). "Predicting Room Occupancy with a Single Passive Infrared (Pir) Sensor through Behavior Extraction," in UbiComp 2016—Proceedings of the 2016 ACM International Joint Conference on Pervasive and Ubiquitous Computing (United States: ACM), 1016-1027. 2016 ACM International Joint Conference on Pervasive and Ubiquitous Computing, UbiComp 2016; Conference date: 12 Sep. 2016 Through 16 Sep. 2016.

Redmon, J., Divvala, S. K., Girshick, R. B., and Farhadi, A. (2016). "You Only Look once: Unified, Real-Time Object Detection," in 2016 IEEE Conference on Computer Vision and Pattern Recognition (CVPR), 779. doi:10.1109/cvpr. 2016.91

Redmon, J., and Farhadi, A. (2018). YOLOv3: An Incremental Improvement. arXiv, ArXiv abs/1804.02767. doi:10.48550/ARXIV.1804.02767

Shashua-Bar, L., Pearlmutter, D., and Erell, E. (2009). The Cooling Efficiency of Urban Landscape Strategies in a Hot Dry Climate. Landsc. urban Plan. 92, 179-186. doi:10.1016/j.landurbplan.2009.04.005

Stewart, R., Andriluka, M., and Ng, A. Y. (2016). "End-to-End People Detection in Crowded Scenes," in Proceedings of the IEEE Conference on Computer Vision and Pattern Recognition (CVPR). doi:10.1109/cvpr. 2016.255

Sulzer, M., Christen, A., and Matzarakis, A. (2022). A Low-Cost Sensor Network for Real-Time Thermal Stress Monitoring and Communication in Occupational Contexts. Sensors 22, 1828. doi:10.3390/s22051828

Teitelbaum, E., Chen, K. W., Meggers, F., Guo, H., Houchois, N., Pantelic, J., et al. (2020). Globe Thermometer Free Convection Error Potentials. Sci. Rep. 10, 2652-2713. doi:10.1038/s41598-020-59441-1

Thorsson, S., Honjo, T., Lindberg, F., Eliasson, I., and Lim, E.-M. (2007). Thermal Comfort and Outdoor Activity in Japanese Urban Public Places. Environ. Behav. 39, 660-684. doi:10.1177/0013916506294937

Thorsson, S., Rocklöv, J., Konarska, J., Lindberg, F., Holmer, B., Dousset, B., et al. (2014). Mean Radiant Temperature—A Predictor of Heat Related Mortality. Urban Clim. 10, 332-345. doi:10.1016/j.uclim.2014.01.004

[Dataset] Tosmonav (2020). Cvat. Available at: https://github.com/openvinotoolkit/cvat.

Vanos, J. K., Rykaczewski, K., Middel, A., Vecellio, D. J., Brown, R. D., and Gillespie, T. J. (2021). Improved Methods for Estimating Mean Radiant Temperature in Hot and Sunny Outdoor Settings. Int. J. Biometeorol. 65, 967-983. doi:10.1007/s00484-021-02131-y Viola, P., Jones, M. J., and Snow, D. (2003). "Detecting Pedestrians Using Patterns of Motion and Appearance," in Proceedings Ninth IEEE International Conference on Computer Vision, 734. doi:10.1109/ICCV. 2003.1238422

Viola, P., and Jones, M. (2001). "Rapid Object Detection Using a Boosted Cascade of Simple Features," in Proceedings of the 2001 IEEE Computer Society Conference on Computer Vision and Pattern Recognition. CVPR. doi:10. 1109/CVPR.2001.990517

Wahl, F., Milenkovic, M., and Amft, O. (2012). "A Distributed Pir-Based Approach for Estimating People Count in Office Environments," in 2012 IEEE 15th International Conference on Computational Science and Engineering, 640-647. doi:10.1109/ICCSE.2012.92

Wang, M., and Wang, X. (2011). Automatic Adaptation of a Generic Pedestrian Detector to a Specific Traffic Scene. CVPR, 3401-3408. doi:10.1109/CVPR. 2011.5995698

Weppner, J., and Lukowicz, P. (2013). "Bluetooth Based Collaborative Crowd Density Estimation with Mobile Phones," in 2013 IEEE International Conference on Pervasive Computing and Communications, PerCom, 193-200. doi:10.1109/PerCom.2013.6526732

Wu, B., and Nevatia, R. (2005). Detection of Multiple, Partially Occluded Humans in a Single Image by Bayesian Combination of Edgelet Part Detectors. Tenth IEEE Int. Conf. Comput. Vis. 1, 90-97. doi:10.1109/iccv.2005.74

Xiaojun, C., Xianpeng, L., and Peng, X. (2015). "lot-based Air Pollution Monitoring and Forecasting System," in 2015 International Conference on Computer and Computational Sciences (ICCCS), 257-260. doi:10.1109/iccacs.2015.7361361

Yao, Y., Zhang, X., Liang, Y., Zhang, X., Shen, F., and Zhao, J. (2020). "A Real-Time Pedestrian Counting System Based on Rgb-D," in 2020 12th International Conference on Advanced Computational Intelligence (ICACI), 110. doi:10. 1109/ICACI49185.2020.9177816

Zappi, P., Farella, E., and Benini, L. (2010). Tracking Motion Direction and Distance with Pyroelectric Ir Sensors. IEEE Sensors J. 10, 1486-1494. doi:10. 1109/JSEN.2009.2039792

Zhang, C., Li, H., Wang, X., and Yang, X. (2015). "Cross-scene Crowd Counting via Deep Convolutional Neural Networks," in Proceedings of the IEEE Conference on Computer Vision and Pattern Recognition (CVPR). doi: 10.1109/cvpr.2015. 7298684

Zhu, L., Deng, Z., Hu, X., Fu, C.-W., Xu, X., Qin, J., et al. (2018). "Bidirectional Feature Pyramid Network with Recurrent Attention Residual Modules for Shadow Detection," in ECCV 2018. Lecture Notes in Computer Science. doi:10. 1007/978-3-030-01231-1_8

What is claimed is:

1. A biometeorological sensing device, comprising:

a processor communicatively coupled to a memory;

a plurality of sensors communicatively coupled to the processor, the plurality of sensors comprising a humidity sensor, a UV sensor, an anemometer, an atmospheric thermometer, a globe thermometer, and a vision system; and a network interface communicatively coupled to the processor;

wherein the processor is configured to:

estimate a mean radiant temperature (MRT) using data received from the plurality of sensors;

identify a person in an image received from the vision system;

determine a bounding box that encloses the person in the image;

generate a binary shadow map from the image;

calculate an intersection over union (IOU) of the bounding box with the shadow map to determine if the person is in the shade; and transmit observed space usage and estimated MRT to a server communicatively coupled to the network interface.

2. The device of claim 1, wherein an embedded computer board is configured to execute a deep learning model.

3. The device of claim 2, the embedded computer board is configured to execute a deep learning model is utilized to detect people in shade and sun.

4. The device of claim 1, wherein the processor generates the shadow map by instructing the embedded computer board to execute a Bi-directional Feature Pyramid with Recurrent Attention Residual Module on the image, the image being provided to the embedded computer board by the processor.

5. The device of claim 1, wherein the vison system comprises a camera.

6. The device of claim 1, where the vision system has capabilities of object detection and identification.

7. The device of claim 1, wherein the computer board is configured to record air temperature, relative humidity, globe temperature, and wind speed at predetermined regular intervals.

8. The device of claim 1, wherein the vision system capabilities include shade detection in outdoor areas.

9. The device of claim 1, wherein the sensors are configured to be powered by DC power.

10. The device of claim 1, wherein air temperature is measured using a white shield to reflect solar radiation to minimize solar radiation impact on the air temperature measurement.

11. A method of monitoring biometeorological conditions and people's use of public spaces with changing weather conditions, the method comprising utilizing a plurality of sensors communicatively coupled to the processor to obtain and store humidity, UV level, wind speed and/or pressure using an anemometer, atmospheric temperature, mean radiant temperature using a globe thermometer, and images using a vision system;

wherein sensor data is stored using a network interface communicatively coupled to the processor; wherein the processor:

estimates a mean radiant temperature (MRT) using data received from the plurality of sensors;

identifies a person in an image received from the camera;

determines a bounding box that encloses the person in the image;

generates a binary shadow map from the image;

calculates an intersection over union (IOU) of the bounding box with the shadow map to determine if the person is in the shade; and transmits observed space usage and estimated MRT to a server communicatively coupled to the network interface.

12. The method of claim 11, wherein an embedded computer board is configured to execute a deep learning model to detect people in shade and sun.

13. The method of claim 11, wherein the processor generates the shadow map by instructing the embedded computer board to execute a Bi-directional Feature Pyramid with Recurrent Attention Residual Module on the image, the image being provided to the embedded computer board by the processor.

14. The method of claim 11, wherein air temperature, relative humidity, globe temperature, and wind speed are recorded at predetermined regular intervals.

15. The method of claim 11, wherein the vision system comprises a camera.

16. The method of claim 11, wherein the vision system identifies objects.

17. The method of claim 11, wherein the vision system identifies shade in outdoor areas.

18. The method of claim 11, wherein the sensors are powered by DC power.

19. The method of claim 11, wherein air temperature is measured using a white shield to reflect solar radiation to minimize solar radiation impact on the air temperature measurement.

20. The method of claim 11, wherein the processer transmits data to a cloud database using WiFi.

* * * * *